United States Patent
Liu et al.

(10) Patent No.: US 12,404,112 B1
(45) Date of Patent: Sep. 2, 2025

(54) CONVEYING LOGISTICS LINE AND METHOD, PALLET LOGISTICS CONTROL METHOD

(71) Applicant: CONTEMPORARY AMPEREX TECHNOLOGY CO., LIMITED, Fujian (CN)

(72) Inventors: Fusheng Liu, Ningde (CN); Shuming Zhang, Ningde (CN); Wentao Zuo, Ningde (CN); Jianguo Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/212,721

(22) Filed: May 20, 2025

Related U.S. Application Data

(63) Continuation of application No. PCT/CN2024/091381, filed on May 7, 2024.

(30) Foreign Application Priority Data

Mar. 1, 2024 (CN) .......................... 202410233414.2

(51) Int. Cl.
*G06F 7/00* (2006.01)
*B65G 43/00* (2006.01)

(52) U.S. Cl.
CPC ...... *B65G 43/00* (2013.01); *B65G 2201/0267* (2013.01)

(58) Field of Classification Search
CPC ............ B65G 43/00; B65G 2201/0267; B65G 37/00; B65G 47/00; B65G 2203/0241; G05B 15/00; G05B 19/00
(Continued)

(56) References Cited

U.S. PATENT DOCUMENTS

| 4,237,598 A | * | 12/1980 | Williamson | ....... G05B 19/4189 29/563 |
| 2018/0111765 A1 | | 4/2018 | Wicks et al. | |

FOREIGN PATENT DOCUMENTS

| CN | 106144538 A | 11/2016 |
| CN | 107640543 A | 1/2018 |

(Continued)

OTHER PUBLICATIONS

International Search Report and Written Opinion mailed on Jul. 14, 2024, received for PCT Application No. PCT/CN2024/091381, filed on May 7, 2024, 18 pages including English Translation.

(Continued)

*Primary Examiner* — Yolanda R Cumbess
(74) *Attorney, Agent, or Firm* — XSENSUS LLP

(57) ABSTRACT

A conveying logistics line includes an unloaded pallet conveying line, a first loaded pallet conveying line, a second loaded pallet conveying line, a merging conveying line, a workpiece retrieval station, and an electrical control module. The electrical control module is communicatively connected to the unloaded pallet conveying line and configured to control quantities of unloaded pallets conveyed by the unloaded pallet conveying line to each of the first workpiece manufacturing machines and each of the second workpiece manufacturing machines, based on real-time quantity information of the loaded pallets on the first loaded pallet conveying line and the second loaded pallet conveying line, where the stable conveying state includes a real-time quantity of the loaded pallets on the first loaded pallet conveying line and a real-time quantity of the loaded pallets on the second loaded pallet conveying line being within a first set range and a second set range, respectively.

16 Claims, 7 Drawing Sheets

(58) Field of Classification Search
USPC .......................................... 700/213, 228, 230
See application file for complete search history.

(56) References Cited

FOREIGN PATENT DOCUMENTS

| | | | | | |
|---|---|---|---|---|---|
| CN | 107640603 | A | | 1/2018 | |
| CN | 208471015 | U | | 2/2019 | |
| CN | 111762555 | A | | 10/2020 | |
| CN | 112093358 | A | | 12/2020 | |
| CN | 112707142 | A | | 4/2021 | |
| CN | 113195385 | A | | 7/2021 | |
| CN | 113231825 | A | | 8/2021 | |
| CN | 214494746 | U | * | 10/2021 | |
| CN | 217971267 | U | | 12/2022 | |
| CN | 218930905 | U | * | 4/2023 | |
| CN | 116176939 | A | | 5/2023 | |
| CN | 116588669 | A | | 8/2023 | |
| CN | 116674950 | A | | 9/2023 | |
| CN | 117800068 | A | | 4/2024 | |
| EP | 0566910 | A1 | | 10/1993 | |
| JP | 2007-189147 | A | | 7/2007 | |
| KR | 10-2010-0046257 | A | | 5/2010 | |
| KR | 20210043667 | A | * | 4/2021 | ......... B65G 47/5127 |

OTHER PUBLICATIONS

Notice of Allowance of the Chinese application No. 202410233414.2, issued on Apr. 4, 2024, 13 pages with English translation.

* cited by examiner

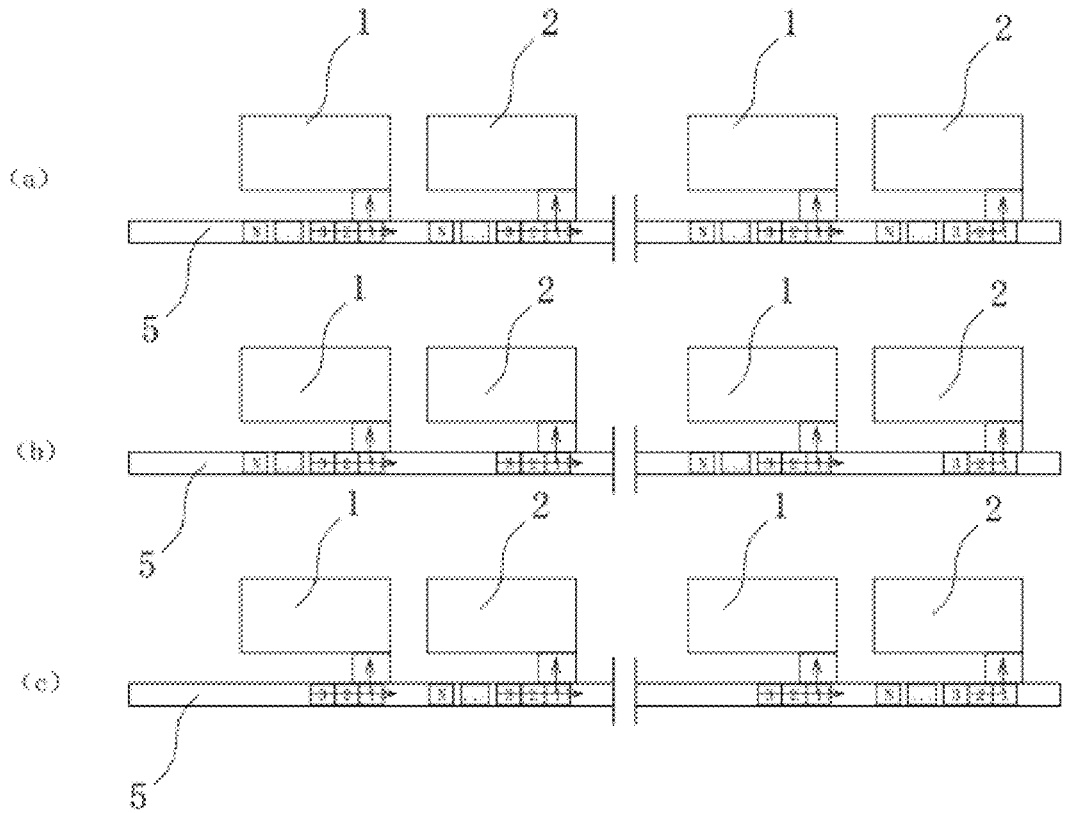

FIG. 6

```
┌─────────────────────────────────────────────────────────────┐
│ Real-time quantity information acquisition step: An electrical control │
│ module acquires real-time quantity information of loaded pallets on a  │
│ first loaded pallet conveying line and loaded pallets on a second      │  ~ S12
│ loaded pallet conveying line                                           │
└─────────────────────────────────────────────────────────────┘
                              │
                              ▼
┌─────────────────────────────────────────────────────────────┐
│ Unloaded pallet allocation step: The electrical control module         │
│ controls, based on the real-time quantity information, a quantity of   │
│ unloaded pallets conveyed by an unloaded pallet conveying line to      │  ~ S13
│ each of first workpiece manufacturing machines and each of second      │
│ workpiece manufacturing machines                                       │
└─────────────────────────────────────────────────────────────┘
```

FIG. 7

CONVEYING LOGISTICS LINE AND METHOD, PALLET LOGISTICS CONTROL METHOD

CROSS-REFERENCE TO RELATED APPLICATIONS

This disclosure is a continuation of International Patent Application No. PCT/CN2024/091381, filed on May 7, 2024, which is based on Chinese Patent Application No. 202410233414.2, filed on Mar. 1, 2024, and entitled "CONVEYING LOGISTICS LINE AND METHOD, PALLET LOGISTICS CONTROL METHOD," and claims the priority of the Chinese patent application, each are incorporated herein by reference in its entirety.

TECHNICAL FIELD

This disclosure relates to the field of battery manufacturing technologies, and particularly to a conveying logistics line and method and a pallet logistics control method.

BACKGROUND

The application of new energy batteries in life and industry is becoming increasingly widespread. For example, new energy vehicles equipped with batteries have been widely used, and batteries are also increasingly being used in the field of energy storage and other fields.

During the production process of batteries, various components constituting the batteries, such as bare cells, need to be conveyed through conveying logistics lines. For battery cells constituted by a plurality of bare cells with different structures, production requires the use of different conveying lines to convey the various bare cells separately. This easily leads to issues such as a complex structure of the conveying logistics lines and large space occupied. Therefore, simplifying such conveying logistics lines is one of the topics that the industry needs to study.

Furthermore, the conveying efficiency of bare cells is an important factor affecting battery production efficiency. Thus, improving conveying efficiency while simplifying the structure of the cell conveying logistics lines is another topic studied by the industry.

SUMMARY

To address the preceding technical issues, this disclosure provides a conveying logistics line and method and a pallet logistics control method, with a simplified structure and high conveying efficiency.

This disclosure is implemented through the following technical solutions.

A first aspect of this disclosure provides a conveying logistics line, including:

an unloaded pallet conveying line, where along an extension direction of the unloaded pallet conveying line, a plurality of workpiece manufacturing machines are sequentially distributed, the plurality of workpiece manufacturing machines include at least one first workpiece manufacturing machine and at least one second workpiece manufacturing machine that are alternately distributed, the unloaded pallet conveying line is connected to an input end of each of the workpiece manufacturing machines, and the unloaded pallet conveying line is configured to be capable of conveying unloaded pallets without workpieces to each of the workpiece manufacturing machines;

a first loaded pallet conveying line connected to an output end of each of the first workpiece manufacturing machines, where the first loaded pallet conveying line is configured to be capable of receiving and conveying loaded pallets with first workpieces from each of the first workpiece manufacturing machines;

a second loaded pallet conveying line connected to an output end of each of the second workpiece manufacturing machines, where the second loaded pallet conveying line is configured to be capable of receiving and conveying loaded pallets with second workpieces from each of the second workpiece manufacturing machines;

a merging conveying line connected to the first loaded pallet conveying line and the second loaded pallet conveying line, where the merging conveying line is configured to receive the loaded pallets from the first loaded pallet conveying line and the loaded pallets from the second loaded pallet conveying line according to a preset sequence;

a workpiece retrieval station, where an input end and output end of the workpiece retrieval station are respectively connected to an output end of the merging conveying line and an input end of the unloaded pallet conveying line; and an electrical control module communicatively connected to the unloaded pallet conveying line and configured to control quantities of unloaded pallets conveyed by the unloaded pallet conveying line to each of the first workpiece manufacturing machines and each of the second workpiece manufacturing machines, based on real-time quantity information of the loaded pallets on the first loaded pallet conveying line and the second loaded pallet conveying line, so as to achieve a stable conveying state within a set operating time of the conveying logistics line, where the stable conveying state includes the real-time quantity of loaded pallets on the first loaded pallet conveying line and the real-time quantity of loaded pallets on the second loaded pallet conveying line being within a first set range and a second set range respectively.

The conveying logistics line has only one unloaded pallet conveying line for conveying unloaded pallets, which reduces the quantity of conveying lines and simplifying the structure of the conveying logistics line. When the conveying logistics line is applied to the process of manufacturing battery cells, the electrical control module controls, based on the real-time quantities of two types of bare cells, the quantity of unloaded pallets conveyed to each of the workpiece manufacturing machines, which affects the output speeds of the two types of bare cells. As a result, the difference in the real-time quantities of the two types of bare cells can be reduced over time, achieving a stable conveying state. This enables stable and continuous production of battery cells and thus improves the production efficiency of battery cells.

In some embodiments, the first loaded pallet conveying line is provided with a first pallet quantity detection assembly, where the first pallet quantity detection assembly is configured to detect a relationship between the real-time quantity of the loaded pallets on the first loaded pallet conveying line and an upper limit value and lower limit value of the first set range; the second loaded pallet conveying line is provided with a second pallet quantity detection assembly, where the second pallet quantity detection assembly is configured to detect a relationship between the real-time quantity of the loaded pallets on the second loaded pallet conveying line and an upper limit value and lower limit value of the second set range; and the electrical control module is communicatively connected to the first pallet quantity detection assembly and the second pallet quantity detection assembly, and capable of controlling, based on data information detected by the first pallet quantity detection assembly and the second pallet quantity detection assembly, quantities of unloaded pallets conveyed by the unloaded pallet conveying line to each of the first workpiece manufacturing machines and each of the second workpiece manufacturing machines.

The first pallet quantity detection assembly can detect whether the quantity of loaded pallets on the first loaded pallet conveying line is less than the lower limit value of the first set range, greater than the upper limit value of the first set range, or within the first set range. The arranged second pallet quantity detection assembly can detect whether the quantity of loaded pallets on the second loaded pallet conveying line is less than the lower limit value of the second set range, greater than the upper limit value of the second set range, or within the second set range. In this way, real-time quantity information of the loaded pallets is obtained. This information provides a basis for the electrical control module to control the unloaded pallet conveying line, and enables the unloaded pallet conveying line to allocate appropriate quantities of unloaded pallets to the two types of workpiece manufacturing machines. Thus, the output speeds of the two types of workpiece manufacturing machines are adjusted. After operating for a certain period, the real-time quantities of the two types of bare cells can reach a basic balance, enabling stable and continuous production of battery cells, and thereby improving the production efficiency of battery cells.

In some embodiments, the first pallet quantity detection assembly includes a first underload detection sensor and a first full-load detection sensor, where the first underload detection sensor and the first full-load detection sensor are sequentially arranged along a conveying path of the first loaded pallet conveying line; the first underload detection sensor is triggered under the condition that the real-time quantity of the loaded pallets on the first loaded pallet conveying line is less than the lower limit value of the first set range; and the first full-load detection sensor is triggered under the condition that the real-time quantity of the loaded pallets on the first loaded pallet conveying line is greater than the upper limit value of the first set range; and the second pallet quantity detection assembly includes a second underload detection sensor and a second full-load detection sensor, where the second underload detection sensor and the second full-load detection sensor are sequentially arranged along a conveying path of the second loaded pallet conveying line; the second underload detection sensor is triggered under the condition that the real-time quantity of the loaded pallets on the second loaded pallet conveying line is less than the lower limit value of the second set range; and the second full-load detection sensor is triggered under the condition that the real-time quantity of the loaded pallets on the second loaded pallet conveying line is greater than the upper limit value of the second set range.

In this way, the first pallet quantity detection assembly achieves detection of the relationship between the real-time quantity of the first workpieces and the upper limit value and lower limit value of the first set range, that is, detecting whether the real-time quantity of the first workpieces is within the first set range, less than the lower limit value of the first set range, or greater than the upper limit value of the first set range; the second pallet quantity detection assembly achieves detection of the relationship between the real-time quantity of the second workpieces and the upper limit value and lower limit value of the second set range, that is, detecting whether the real-time quantity of the second workpieces is within the second set range, less than the lower limit value of the second set range, or greater than the upper limit value of the second set range. The real-time quantity information of the first workpieces and the second workpieces provides a basis for the electrical control module to control the unloaded pallet conveying line, and enables the unloaded pallet conveying line to allocate appropriate quantities of unloaded pallets to the two types of workpiece manufacturing machines. Thus, the output speeds of the two types of workpiece manufacturing machines are adjusted. After operating for a certain period, the real-time quantities of the two types of bare cells can reach a basic balance, enabling stable and continuous production of battery cells, and thereby improving the production efficiency of battery cells.

In some embodiments, the electrical control module has a first control mode, a second control mode, and a third control mode, the electrical control module adopts the first control mode under the condition that the real-time quantity of the loaded pallets on the first loaded pallet conveying line and the real-time quantity of the loaded pallets on the second loaded pallet conveying line are respectively within the first set range and the second set range, or respectively less than the lower limit value of the first set range and the lower limit value of the second set range, or respectively greater than the upper limit value of the first set range and the upper limit value of the second set range, where the first control mode also serves as an initial default mode;

the electrical control module adopts the second control mode under the condition that the real-time quantity of the loaded pallets on the first loaded pallet conveying line is less than the lower limit value of the first set range and the real-time quantity of the loaded pallets on the second loaded pallet conveying line is greater than the upper limit value of the second set range; and the electrical control module adopts the third control mode under the condition that the real-time quantity of the loaded pallets on the first loaded pallet conveying line is greater than the upper limit value of the first set range and the real-time quantity of the loaded pallets on the second loaded pallet conveying line is less than the lower limit value of the second set range.

The foregoing three control modes switch based on the real-time quantity information of the loaded pallets, enabling the conveying logistics line in an unbalanced state to achieve a stable conveying state within a set time, thereby ensuring stable and continuous production of battery cells and further improving the production efficiency of battery cells.

In some embodiments, in the first control mode, the electrical control module controls the unloaded pallet conveying line to sequentially convey a set quantity of unloaded pallets to workpiece manufacturing machines one by one, starting from a first machine and ending with a last machine; after all the workpiece manufacturing machines have received the set quantity of unloaded pallets, the unloaded pallet conveying line cyclically add one unloaded pallet to each of the workpiece manufacturing machines starting from the first machine and ending with the last machine until a quantity of unloaded pallets cached at each workpiece manufacturing machine reaches a maximum allowable cache capacity;

in the second control mode, the electrical control module controls the unloaded pallet conveying line to preferentially input unloaded pallets to the first workpiece manufacturing machines to maintain a quantity of unloaded pallets cached at each of the first workpiece manufacturing machines at a maximum allowable cache capacity, and convey at least a set quantity of unloaded pallets to the second workpiece manufacturing machines and temporarily store these unloaded pallets outside an entrance of the second workpiece manufacturing machines; where the unloaded pallets temporarily stored outside the entrance of the second workpiece manufacturing machines are used to be input into the second workpiece manufacturing machines when the conveying logistics line switches from the second control mode to the first control mode; and in the third control mode, the electrical control module controls the unloaded pallet conveying line to preferentially input unloaded pallets to the second workpiece manufacturing machines to maintain a quantity of unloaded pallets cached at each of the second workpiece manufacturing machines at a maximum allowable cache capacity, and convey at least a set quantity of unloaded pallets to the first workpiece manufacturing machines and temporarily store these unloaded pallets outside an entrance of the first workpiece manufacturing machines; where the unloaded pallets temporarily stored outside the entrance of the first workpiece manufacturing machines are used to be input into the first workpiece manufacturing machines when the conveying logistics line switches from the third control mode to the first control mode.

The foregoing describes specific operating methods of the three control modes, which can ensure that, within the set operating time of the conveying logistics line, the real-time quantity of the loaded pallets on the first loaded pallet conveying line and the real-time quantity of the loaded pallets on the second loaded pallet conveying line are respectively within the first set range and the second set range.

In some embodiments, the set quantity includes 3.

Temporarily storing unloaded pallets outside the entrance of a workpiece manufacturing machine is intended to input these unloaded pallets into the workpiece manufacturing machine promptly after the control modes switch, enabling the workpiece manufacturing machine to operate in a timely manner. Temporarily storing three unloaded pallets outside the entrance of the workpiece manufacturing machine can both meet the short-term demand for unloaded pallets by the workpiece manufacturing machine while leaving a sufficient quantity of unloaded pallets for other workpiece manufacturing machines, ensuring adequate circulation of unloaded pallets and thus enabling normal operation of the conveying logistics line.

In some embodiments, a conveying path of the first loaded pallet conveying line, a conveying path of the second loaded pallet conveying line, and a conveying path of the unloaded pallet conveying line are sequentially distributed from top to bottom, and the workpiece manufacturing machines are all correspondingly arranged on the same side of the first loaded pallet conveying line, the second loaded pallet conveying line, and the unloaded pallet conveying line.

With this arrangement, the first loaded pallet conveying line, the second loaded pallet conveying line, and the unloaded pallet conveying line occupy less space. Moreover, distances between the three conveying lines, namely, the first loaded pallet conveying line, the second loaded pallet conveying line, and the unloaded pallet conveying line, and the workpiece manufacturing machines are relatively short, reducing the space occupied by the conveying logistics line.

In some embodiments, the conveying path of the second loaded pallet conveying line, a conveying path of the merging conveying line, and a conveying path of the workpiece retrieval station are at the same height; the conveying logistics line further includes a first lifting mechanism, a third loaded pallet conveying line, and a second lifting mechanism, where a conveying path of the third loaded pallet conveying line and the conveying path of the second loaded pallet conveying line are at the same height, a top input end and a bottom output end of the first lifting mechanism are respectively connected to an output end of the first loaded pallet conveying line and an input end of the third loaded pallet conveying line, and an output end of the third loaded pallet conveying line is connected to an input end of the merging conveying line; and a top input end and a bottom output end of the second lifting mechanism are respectively connected to an output end of the workpiece retrieval station and an input end of the unloaded pallet conveying line.

In this way, cyclic conveying of pallets is completed, thereby realizing transportation of workpieces. The conveying logistics line has a simple structure, a reasonable layout, and a small space occupied.

In some embodiments, the workpieces include bare cells.

The conveying logistics line is applied to a solution for conveying bare cells, realizing the conveying of bare cells and enabling stable and continuous production of battery cells, thereby improving the production efficiency of battery cells.

A second aspect of this disclosure provides a pallet logistics control method applied to a conveying logistics line, where the conveying logistics line includes:

an unloaded pallet conveying line, where along an extension direction of the unloaded pallet conveying line, a plurality of workpiece manufacturing machines are sequentially distributed, the plurality of workpiece manufacturing machines include at least one first workpiece manufacturing machine and at least one second workpiece manufacturing machine that are alternately distributed, the unloaded pallet conveying line is connected to an input end of each of the workpiece manufacturing machines, and the unloaded pallet conveying line is configured to be capable of conveying unloaded pallets without workpieces to each of the workpiece manufacturing machines;

a first loaded pallet conveying line connected to an output end of each of the first workpiece manufacturing machines, where the first loaded pallet conveying line is configured to be capable of receiving and conveying loaded pallets with first workpieces from each of the first workpiece manufacturing machines;

a second loaded pallet conveying line connected to an output end of each of the second workpiece manufacturing machines, where the second loaded pallet conveying line is configured to be capable of receiving and conveying loaded pallets with second workpieces from each of the second workpiece manufacturing machines;

a merging conveying line connected to the first loaded pallet conveying line and the second loaded pallet conveying line, where the merging conveying line receives the loaded pallets from the first loaded pallet conveying line and the loaded pallets from the second loaded pallet conveying line according to a preset sequence;

a workpiece retrieval station, where an input end and output end of the workpiece retrieval station are respectively connected to an output end of the merging conveying line and an input end of the unloaded pallet conveying line; and an electrical control module communicatively connected to the unloaded pallet conveying line, where the electrical control module controls the unloaded pallet conveying line using the control method so that the conveying logistics line achieves a stable conveying state within a set operating time, the stable conveying state including a real-time quantity of the loaded pallets on the first loaded pallet conveying line and a real-time quantity of the loaded pallets on the second loaded pallet conveying line being within a first set range and a second set range, respectively; and the control method includes:

a real-time quantity information acquisition step: acquiring, by the electrical control module, real-time quantity information of the loaded pallets on the first loaded pallet conveying line and the loaded pallets on the second loaded pallet conveying line;

an unloaded pallet allocation step: controlling, by the electrical control module based on the real-time quantity information, quantities of unloaded pallets conveyed by the unloaded pallet conveying line to each of the first workpiece manufacturing machines and each of the second workpiece manufacturing machines.

During the foregoing conveying process, the electrical control module controls, based on the real-time quantity information of two types of bare cells, the quantity of unloaded pallets conveyed to each of the workpiece manufacturing machines, which affects the output speeds of the two types of bare cells. As a result, the difference in the real-time quantities of the two types of bare cells can be reduced over time, achieving a stable conveying state. This enables stable and continuous production of battery cells and thus improves the production efficiency of battery cells.

In some embodiments, the electrical control module has a first control mode, a second control mode, and a third control mode, where the first control mode serves as an initial default mode; and the unloaded pallet allocation step includes:

adopting, by the electrical control module, the first control mode under the condition that the real-time quantity of the loaded pallets on the first loaded pallet conveying line and the real-time quantity of the loaded pallets on the second loaded pallet conveying line are respectively within the first set range and the second set range, or respectively less than a lower limit value of the first set range and a lower limit value of the second set range, or respectively greater than an upper limit value of the first set range and an upper limit value of the second set range;

adopting, by the electrical control module, the second control mode under the condition that the real-time quantity of the loaded pallets on the first loaded pallet conveying line is less than a lower limit value of the first set range and the real-time quantity of the loaded pallets on the second loaded pallet conveying line is greater than an upper limit value of the second set range; and adopting, by the electrical control module, the third control mode under the condition that the real-time quantity of the loaded pallets on the first loaded pallet conveying line is greater than an upper limit value of the first set range and the real-time quantity of the loaded pallets on the second loaded pallet conveying line is less than a lower limit value of the second set range.

The foregoing three control modes switch based on the real-time quantity of the loaded pallets, enabling the conveying logistics line in an unbalanced state to achieve a stable conveying state within a set time, thereby ensuring stable and continuous production of battery cells and further improving the production efficiency of battery cells.

In some embodiments, in the first control mode, the electrical control module controls the unloaded pallet conveying line to sequentially convey a set quantity of unloaded pallets to workpiece manufacturing machines one by one, starting from a first machine and ending with a last machine; after all the workpiece manufacturing machines have received the set quantity of unloaded pallets, the unloaded pallet conveying line cyclically add one unloaded pallet to each of the workpiece manufacturing machines starting from the first machine and ending with the last machine until a quantity of unloaded pallets cached at each workpiece manufacturing machine reaches a maximum allowable cache capacity;

in the second control mode, the electrical control module controls the unloaded pallet conveying line to preferentially input unloaded pallets to the first workpiece manufacturing machines to maintain a quantity of unloaded pallets cached at each of the first workpiece manufacturing machines at a maximum allowable cache capacity, and convey at least a set quantity of unloaded pallets to the second workpiece manufacturing machines and temporarily store these unloaded pallets outside an entrance of the second workpiece manufacturing machines; and in the third control mode, the electrical control module controls the unloaded pallet conveying line to preferentially input unloaded pallets to the second workpiece manufacturing machines to maintain a quantity of unloaded pallets cached at each of the second workpiece manufacturing machines at a maximum allowable cache capacity, and convey at least a set quantity of unloaded pallets to the first workpiece manufacturing machines and temporarily store these unloaded pallets outside an entrance of the first workpiece manufacturing machines; where the set quantity includes 3.

The foregoing describes specific operating methods of the three control modes, which can ensure that, within the set operating time of the conveying logistics line, the real-time quantity of the loaded pallets on the first loaded pallet conveying line and the real-time quantity of the loaded pallets on the second loaded pallet conveying line are respectively within the first set range and the second set range.

A third aspect of this disclosure provides a conveying logistics method applied to a conveying logistics line, where the conveying logistics line includes:

an unloaded pallet conveying line, where along an extension direction of the unloaded pallet conveying line, a plurality of workpiece manufacturing machines are sequentially distributed, the plurality of workpiece manufacturing machines include at least one first workpiece manufacturing machine and at least one second workpiece manufacturing machine that are alternately distributed;

a first loaded pallet conveying line connected to an output end of each of the first workpiece manufacturing machines, where the first loaded pallet conveying line is configured to be capable of receiving and conveying loaded pallets with first workpieces from each of the first workpiece manufacturing machines;

a second loaded pallet conveying line connected to an output end of each of the second workpiece manufacturing machines, where the second loaded pallet conveying line is configured to be capable of receiving and conveying loaded pallets with second workpieces from each of the second workpiece manufacturing machines;

a merging conveying line connected to the first loaded pallet conveying line and the second loaded pallet conveying line;

a workpiece retrieval station, where an input end and output end of the workpiece retrieval station are respectively connected to an output end of the merging conveying line and an input end of the unloaded pallet conveying line; and an electrical control module communicatively connected to the unloaded pallet conveying line; and the conveying logistics method includes:

an electrical control step: acquiring, by the electrical control module, real-time quantity information of the loaded pallets on the first loaded pallet conveying line and the second loaded pallet conveying line, and control, based on the real-time quantity information, quantities of unloaded pallets conveyed by the unloaded pallet conveying line to each of the first workpiece manufacturing machines and each of the second workpiece manufacturing machines;

a workpiece receiving step: inputting, by the workpiece manufacturing machines, unloaded pallets to receiving positions, place manufactured workpieces into the unloaded pallets, and outputting the loaded pallets with the workpieces to the first loaded pallet conveying line and the second loaded pallet conveying line, where the first workpiece manufacturing machines and the second workpiece manufacturing machines respectively output the loaded pallets to the first loaded pallet conveying line and the second loaded pallet conveying line;

a merging step: receiving, by the merging conveying line, the loaded pallets from the first loaded pallet conveying line and the second loaded pallet conveying line according to a preset sequence;

a workpiece retrieval step: receiving, by the workpiece retrieval station receives the loaded pallets from the merging conveying line, retrieving the workpieces in the loaded pallets, leaving unloaded pallets at the output end of the workpiece retrieval station, and conveying, by the workpiece retrieval station the unloaded pallets to the unloaded pallet conveying line; where the conveying logistics line is capable of achieving a stable conveying state within a set operating time using the conveying logistics method, where the stable conveying state includes a real-time quantity of the loaded pallets on the first loaded pallet conveying line and a real-time quantity of the loaded pallets on the second loaded pallet conveying line being within a first set range and a second set range, respectively.

During the foregoing conveying process, the electrical control module controls, based on the real-time quantity information of two types of bare cells, the quantity of unloaded pallets conveyed to each of the workpiece manufacturing machines, which affects the output speeds of the two types of bare cells. As a result, the difference in the real-time quantities of the two types of bare cells can be reduced over time, achieving a stable conveying state. This enables stable and continuous production of battery cells and thus improves the production efficiency of battery cells.

In some embodiments, the electrical control step includes:

an initial allocation step: controlling, by the electrical control module using an initial default mode, the unloaded pallet conveying line to convey unloaded pallets not carrying workpieces to each of the workpiece manufacturing machines;

a real-time quantity information acquisition step: acquiring, by the electrical control module, real-time quantity information of the loaded pallets on the first loaded pallet conveying line and the loaded pallets on the second loaded pallet conveying line;

an unloaded pallet allocation step: controlling, by the electrical control module based on the real-time quantity information, quantities of unloaded pallets conveyed by the unloaded pallet conveying line to each of the first workpiece manufacturing machines and each of the second workpiece manufacturing machines.

In this way, the foregoing steps can acquire the real-time quantity information of the first workpieces and the second workpieces, providing a basis for the electrical control module to control the unloaded pallet conveying line. This enables the unloaded pallet conveying line to allocate appropriate quantities of unloaded pallets to the two types of workpiece manufacturing machines, thereby adjusting the output speeds of the two types of workpiece manufacturing machines. After operating for a certain period, the real-time quantities of the two types of bare cells can reach a basic balance, enabling stable and continuous production of battery cells, and thereby improving the production efficiency of battery cells.

In some embodiments, the electrical control module has a first control mode, a second control mode, and a third control mode, where the first control mode serves as the initial default mode; and the unloaded pallet allocation step includes:

adopting, by the electrical control module, the first control mode under the condition that the real-time quantity of the loaded pallets on the first loaded pallet conveying line and the real-time quantity of the loaded pallets on the second loaded pallet conveying line are respectively within the first set range and the second set range, or respectively less than a lower limit value of the first set range and a lower limit value of the second set range, or respectively greater than an upper limit value of the first set range and an upper limit value of the second set range;

adopting, by the electrical control module, the second control mode under the condition that the real-time quantity of the loaded pallets on the first loaded pallet conveying line is less than a lower limit value of the first set range and the real-time quantity of the loaded pallets on the second loaded pallet conveying line is greater than an upper limit value of the second set range; and adopting, by the electrical control module, the third control mode under the condition that the real-time quantity of the loaded pallets on the first loaded pallet conveying line is greater than an upper limit value of the first set range and the real-time quantity of the loaded pallets on the second loaded pallet conveying line is less than a lower limit value of the second set range.

The foregoing three control modes switch based on the real-time quantity information of the loaded pallets, enabling the conveying logistics line in an unbalanced state to achieve a stable conveying state within a set time, thereby ensuring stable and continuous production of battery cells and further improving the production efficiency of battery cells.

In some embodiments, in the first control mode, the electrical control module controls the unloaded pallet conveying line to sequentially convey a set quantity of unloaded pallets to workpiece manufacturing machines one by one, starting from a first machine and ending with a last machine; after all the workpiece manufacturing machines have received the set quantity of unloaded pallets, the unloaded pallet conveying line cyclically add one unloaded pallet to each of these workpiece manufacturing machines starting from the first machine and ending with the last machine until a quantity of unloaded pallets cached at each workpiece manufacturing machine reaches a maximum allowable cache capacity;

in the second control mode, the electrical control module controls the unloaded pallet conveying line to preferentially input unloaded pallets to the first workpiece manufacturing machines to maintain a quantity of unloaded pallets cached at each of the first workpiece manufacturing machines at a maximum allowable cache capacity, and convey at least a set quantity of unloaded pallets to the second workpiece manufacturing machines and temporarily store these unloaded pallets outside an entrance of the second workpiece manufacturing machines; and in the third control mode, the electrical control module controls the unloaded pallet conveying line to preferentially input unloaded pallets to the second workpiece manufacturing machines to maintain a quantity of unloaded pallets cached at each of the second workpiece manufacturing machines at a maximum allowable cache capacity, and convey at least a set quantity of unloaded pallets to the first workpiece manufacturing machines and temporarily store these unloaded pallets outside an entrance of the first workpiece manufacturing machines; where the set quantity includes 3.

The foregoing describes specific operating methods of the three control modes, which can ensure that, within the set operating time of the conveying logistics line, the real-time quantity of the loaded pallets on the first loaded pallet conveying line and the real-time quantity of the loaded pallets on the second loaded pallet conveying line are respectively within the first set range and the second set range.

Through some embodiments of this disclosure, a conveying logistics line and method and a pallet logistics control method with a simplified structure and high conveying efficiency are provided.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred implementations and are not intended to limit this disclosure. Moreover, throughout the accompanying drawings, the same reference signs represent the same parts. In the accompanying drawings:

FIG. 6 is a top view of an unloaded pallet conveying line of a conveying logistics line in three control modes according to some embodiments of this disclosure;

FIG. 7 is a schematic flowchart of a pallet logistics control method according to some embodiments of this disclosure;

DESCRIPTION OF REFERENCE NUMERALS

Figure 1:
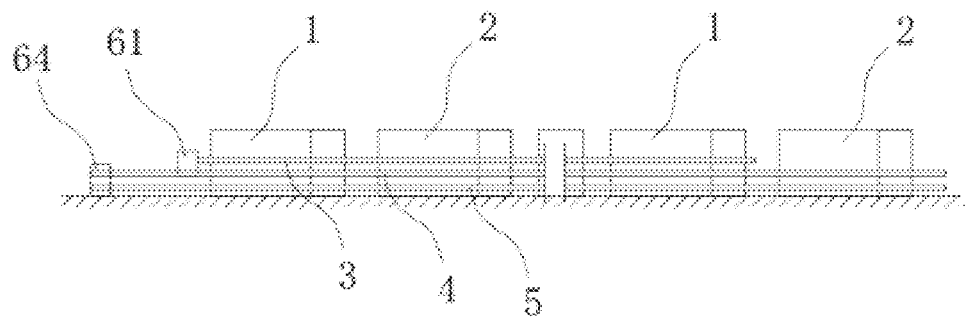
FIG. 1 is a front view of a conveying logistics line according to some embodiments of this disclosure.

1. First workpiece manufacturing machine; 2. Second workpiece manufacturing machine; 3. First loaded pallet conveying line; 4. Second loaded pallet conveying line; 5. Unloaded pallet conveying line; 61. First lifting mechanism; 62. Third loaded pallet conveying line; 63. Merging conveying line; 64. Second lifting mechanism; 7. Workpiece retrieval station; 8. Unloaded pallet; 9. Loaded pallet; 11. First underload detection sensor; 12. First full-load detection sensor; 13. Second underload detection sensor; 14. Second full-load detection sensor.

DESCRIPTION OF EMBODIMENTS

The following will describe the embodiments of the technical solutions of this disclosure in detail with reference to the accompanying drawings.

The following embodiments are only for a clearer explanation of the technical solutions of this disclosure, and therefore they are only examples and cannot be used to limit the scope of protection of this disclosure.

Unless otherwise defined, all technical and scientific terms used herein have the same meanings as commonly understood by persons of ordinary skill in the art to which this disclosure belongs; the terms used herein are only for the purpose of describing specific embodiments and are not intended to limit this disclosure; the terms "include" and "have" and any variations thereof in the specification and the accompanying drawings of this disclosure are intended to cover non-exclusive inclusions.

In the description of the embodiments of this disclosure, the technical terms "first", "second", "third", and the like are only used to distinguish different objects and cannot be understood as indicating or implying relative importance or implicitly indicating the number, specific order, or primary-secondary relationship of the indicated technical features. In the description of the embodiments of this disclosure, "a plurality of" means more than two unless otherwise explicitly specified.

As mentioned herein, "embodiment" means that specific features, structures, or characteristics described with reference to an embodiment can be included in at least one embodiment of this disclosure. The word "embodiment" appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the description of the embodiments of this disclosure, the term "and/or" is only an associative relationship for describing associated objects, indicating that three relationships may be present. For example, A and/or B may indicate the following three cases: presence of only A, presence of both A and B, and presence of only B. In addition, a character "/" in this specification generally indicates an "or" relationship between contextually associated objects.

In the description of the embodiments of this disclosure, the technical terms "length", "width", "thickness", "upper", "lower", "front", "rear", "left", "right", "vertical", "horizontal", "top", "bottom", "inner", "outer", "circumferential", and the like indicating orientation or positional relationships are based on the orientation or positional relationships shown in the drawings, and are only for the convenience of describing the embodiments of this disclosure and simplifying the description, rather than indicating or implying that the apparatuses or elements referred to must have specific orientations, be constructed, operated, or used in specific orientations, and therefore should not be understood as limiting the embodiments of this disclosure.

In the description of the embodiments of this disclosure, unless otherwise specified and defined explicitly, the technical terms "mounting", "connection", "joining", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this disclosure as appropriate to specific situations.

In the description of the embodiments of this disclosure, unless otherwise specified and defined explicitly, the technical term "contact" should be broadly understood, and may be direct contact or contact through an intermediate medium layer, may be contact between two objects with essentially no interaction force, or may be contact between two objects with interaction force.

This disclosure will be described in detail below.

Currently, the application of new energy batteries in life and industry is becoming increasingly widespread. New energy batteries have been widely used in energy storage power supply systems such as hydroelectric power plants, thermal power plants, wind power plants, and solar power plants, as well as in many other fields including electric transportation tools such as electric bicycles, electric motorcycles, and electric vehicles, and aerospace. With the continuous expansion of application fields of traction batteries, market demands for traction batteries are also increasing.

During the production process of batteries, various components constituting the batteries, such as bare cells, need to be conveyed through conveying logistics lines. In the production of battery cells, there are cases in which a plurality of bare cells with different structures (for example, different winding methods) are paired and assembled into a housing. For battery cells constituted by a plurality of bare cells with different structures, production typically uses a plurality of parallel conveying lines to convey the various bare cells separately. Bare cells with different structures may have inconsistent winding methods. Herein, a scenario in which two bare cells with different winding methods are paired and assembled into a housing is taken as an example for explanation. The two types of bare cells with inconsistent winding methods may be referred to as type-A bare cells and type-B bare cells. During production, they need to be paired one-to-one for use, forming patterns such as ABAB and ABBA, and then collectively assembled into a housing to form a battery cell.

For the conveying logistics line of such bare cells, in the related art, each type of bare cell winding machine is provided with an input line for inputting unloaded pallets to the winding machine and an output line for receiving loaded pallets with bare cells from the winding machine and conveying the loaded pallets away. Such a configuration makes the structure of the entire cell conveying logistics line cumbersome and complex, with high equipment costs and large space occupation.

In view of the situation in the foregoing related art, it is considered to merge the input lines for inputting unloaded pallets configured for a plurality of winding machines into one, meaning that various winding machines share a single input line, which reduces the quantity of input lines and thus simplifies the structure. However, since winding machines used for winding different bare cells cannot provide a continuous output due to the need for material switching and the like, there exists a case in which the intermittent outputs of the winding machines do not match. Sharing a single input line easily leads to an unreasonable allocation of unloaded pallets to various winding machines. For example, the winding speed of a type-A winding machine remains constant, while a type-B winding machine, in a material-switching standby state, reduces the output speed of type-B bare cells, resulting in a relatively smaller quantity of type-B bare cells and a relatively larger quantity of type-A bare cells. If unloaded pallets continue to be allocated to the type-A winding machine and the type-B winding machine at the previous ratio, it is likely to result in relatively more type-A bare cells and relatively fewer type-B bare cells being output. This easily causes a shortage of type-B bare cells, which in turn prevents the integration of type-A bare cells and type-B bare cells from continuing, thereby affecting the production efficiency of battery cells.

To address this, the inventors of this disclosure, after research, have found that the quantity of unloaded pallets allocated to the type-A winding machine and the quantity of unloaded pallets allocated to the type-B winding machine can be adjusted based on the real-time quantities of type-A bare cells and type-B bare cells, so that bare cells with a larger real-time quantity are produced at a slower speed, while bare cells with a smaller real-time quantity are produced at a relatively faster speed. Operating in this mode for a certain period can bring the real-time quantities of the two types of bare cells to a basic balance, ensuring stable and continuous production of bare cells and thus improving the production efficiency of bare cells.

Based on this design concept, the inventors of this disclosure have designed a conveying logistics line, where the conveying logistics line includes an unloaded pallet conveying line, a first loaded pallet conveying line, a second loaded pallet conveying line, a merging conveying line, a workpiece retrieval station, and an electrical control module. Along an extension direction of the unloaded pallet conveying line, a plurality of workpiece manufacturing machines are sequentially distributed. The plurality of workpiece manufacturing machines include at least one first workpiece manufacturing machine and at least one second workpiece manufacturing machine alternately distributed. The first workpiece manufacturing machine and the second workpiece manufacturing machine are used to manufacture a first type of bare cell (also referred to as type-A bare cell) and a second type of bare cell (also referred to as type-B bare cell), respectively. The unloaded pallet conveying line is connected to an input end of each of the workpiece manufacturing machines, and the unloaded pallet conveying line is configured to be capable of conveying unloaded pallets without workpieces to each of the workpiece manufacturing machines; the first loaded pallet conveying line is connected to an output end of each of the first workpiece manufacturing machines, where the first loaded pallet conveying line is configured to be capable of receiving and conveying loaded pallets with first workpieces from each of the first workpiece manufacturing machines; the second loaded pallet conveying line is connected to an output end of each of the second workpiece manufacturing machines, where the second loaded pallet conveying line is configured to be capable of receiving and conveying loaded pallets with second workpieces from each of the second workpiece manufacturing machines; the merging conveying line is connected to the first loaded pallet conveying line and the second loaded pallet conveying line, where the merging conveying line is configured to receive the loaded pallets from the first loaded pallet conveying line and the loaded pallets from the second loaded pallet conveying line according to a preset sequence; an input end and output end of the workpiece retrieval station are respectively connected to an output end of the merging conveying line and an input end of the unloaded pallet conveying line; and the electrical control module is communicatively connected to the unloaded pallet conveying line configured to control quantities of unloaded pallets conveyed by the unloaded pallet conveying line to each of the first workpiece manufacturing machines and each of the second workpiece manufacturing machines, based on real-time quantity information of the loaded pallets on the first loaded pallet conveying line and the second loaded pallet conveying line, so as to achieve a stable conveying state within a set operating time of the conveying logistics line, where the stable conveying state includes a real-time quantity of the loaded pallets on the first loaded pallet conveying line and a real-time quantity of the loaded pallets on the second loaded pallet conveying line being within a first set range and a second set range, respectively.

When the conveying logistics line is applied to convey bare cells in the battery cell production process, the first workpiece manufacturing machine is used to wind type-A bare cells, and the second workpiece manufacturing machine is used to wind type-B bare cells. The electrical control module adjusts the quantities of unloaded pallets allocated to the type-A winding machine and the type-B winding machine, based on the real-time quantities of type-A bare cells and type-B bare cells, so that bare cells with a larger real-time quantity are produced at a slower speed, while bare cells with a smaller real-time quantity are produced at a relatively faster speed. Operating in this mode for a certain period can bring the real-time quantities of the two types of bare cells to a basic balance, enabling stable and continuous production of battery cells and thus improving the production efficiency of battery cells.

The conveying logistics line of the embodiments of this disclosure can be used in the battery production process, for example, to convey bare cells for batteries. Of course, those skilled in the art should understand that the conveying logistics line provided in the embodiments of this disclosure is not only used to convey bare cells in the battery manufacturing process but can also be used to convey other workpieces that need to be conveyed.

In the embodiments of this disclosure, the battery cell may be a secondary battery, and the secondary battery refers to a battery cell that can be recharged to activate the active material for continuous use after the battery cell is discharged.

The battery cell may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead storage battery, or the like. This is not limited in the embodiments of this disclosure.

Although not illustrated, the battery cell typically includes an electrode assembly (for example, a bare cell). The electrode assembly includes a positive electrode, a negative electrode, and a separator. During charging and discharging of the battery cell, active ions (such as lithium ions) intercalate and deintercalate back and forth between the positive electrode and the negative electrode. The separator is arranged between the positive electrode and the negative electrode to prevent short circuit of the positive electrode and negative electrode and to allow the active ions to pass through.

In some embodiments, the electrode assembly is provided with tabs (not shown), where the tabs can conduct current from the electrode assembly. The tabs include a positive tab and a negative tab.

In some embodiments, the battery cell may include a housing.

The housing is configured to encapsulate the electrode assembly, the electrolyte, and other components. The housing may be steel housing, aluminum housing, plastic housing (for example, polypropylene), composite metal housing (for example, copper-aluminum composite housing), aluminum-plastic film, or the like.

In an example, the battery cell may be a cylindrical battery cell, a prismatic battery cell, a pouch battery cell, or a battery cell of another shape. The prismatic battery cell includes a square shell battery cell, a blade battery cell, and a polygonal battery, such as a hexagonal battery. This is not particularly limited in the embodiments of this disclosure.

In some embodiments, the housing includes a shell and an end cover, where the shell is provided with an opening, and the end cover closes the opening to form a closed space for accommodating the electrode assembly and substances such as the electrolyte. The shell may be provided with one or more openings. One or more end covers may be provided.

In some embodiments, the housing is provided with at least one electrode terminal, where the electrode terminal is electrically connected to the tab. The electrode terminal may be directly connected to the tab or may be indirectly connected to the tab through an adapter. The electrode terminal may be provided on the end cover or on the shell.

Some embodiments of this disclosure will be described in detail below with reference to FIG. 1 to FIG. 6.

Figure 2:
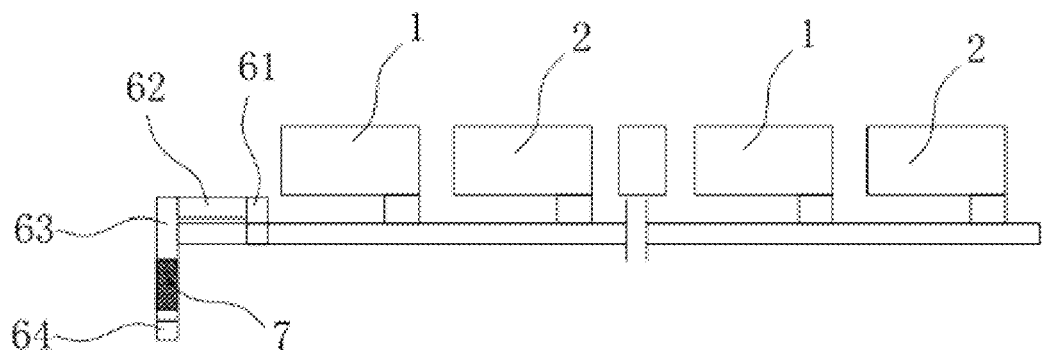
FIG. 2 is a top view of a conveying logistics line according to some embodiments of this disclosure.
Figure 3:
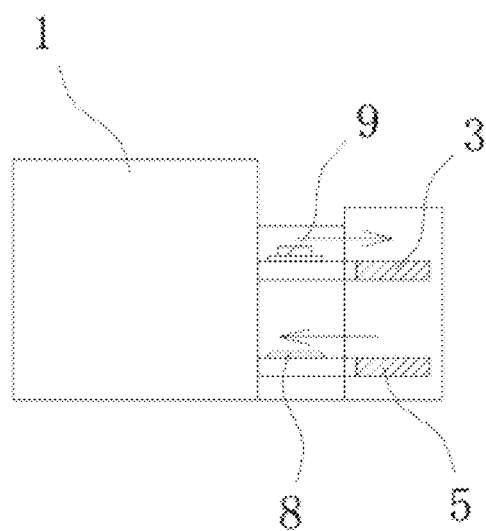
FIG. 3 is a lateral schematic diagram of a conveying logistics line at a first workpiece manufacturing machine according to some embodiments of this disclosure.
Figure 4:
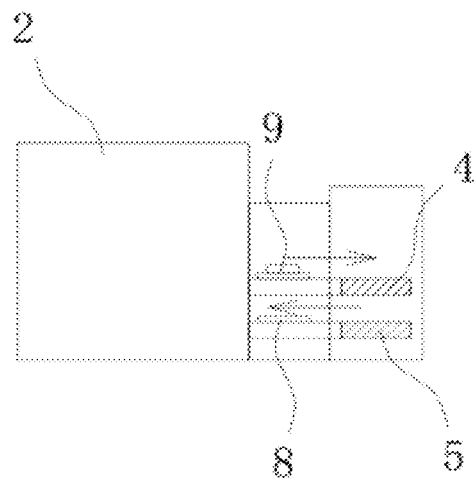
FIG. 4 is a lateral schematic diagram of a conveying logistics line at a second workpiece manufacturing machine according to some embodiments of this disclosure.
Figure 5:
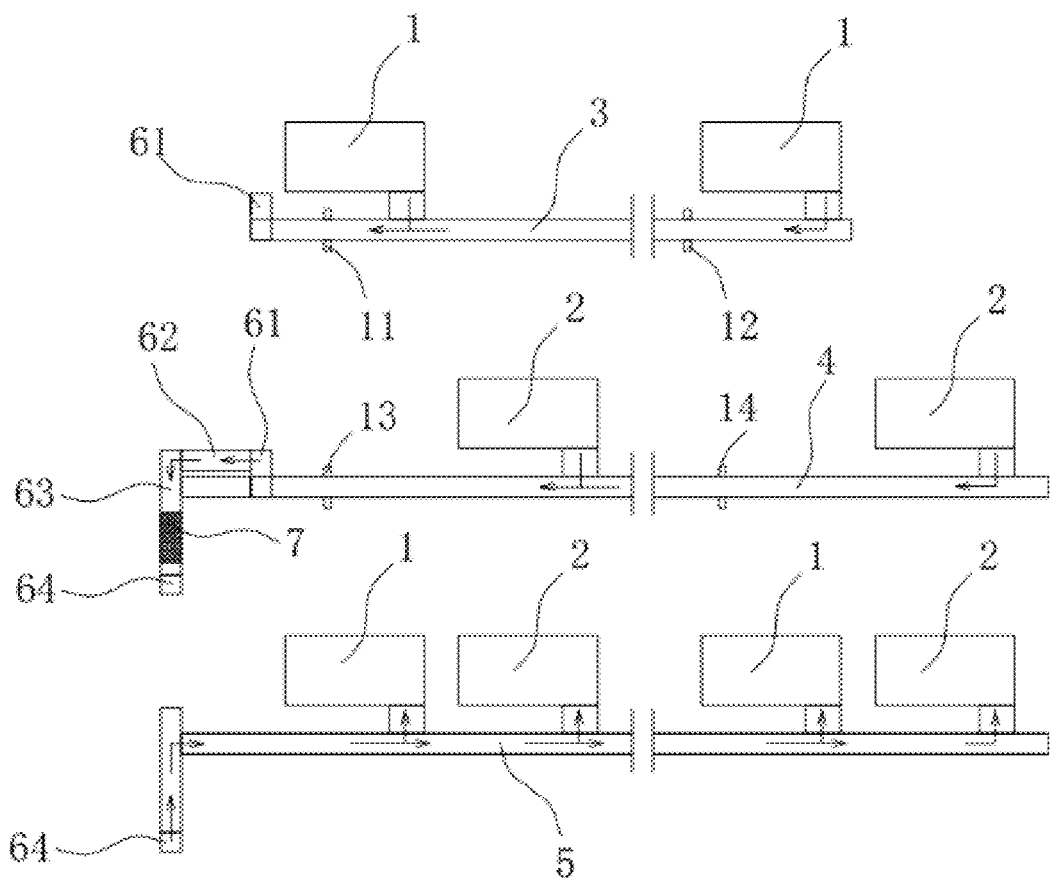
FIG. 5 is a top view of a conveying logistics line divided into a three-layer structure by height according to some embodiments of this disclosure.

FIG. 1 is a front view of a conveying logistics line according to some embodiments of this disclosure; FIG. 2 is a top view of a conveying logistics line according to some embodiments of this disclosure; FIG. 3 is a lateral schematic diagram of a conveying logistics line at a first workpiece manufacturing machine according to some embodiments of this disclosure; FIG. 4 is a lateral schematic diagram of a conveying logistics line at a second workpiece manufacturing machine according to some embodiments of this disclosure; FIG. 5 is a top view of a conveying logistics line divided into a three-layer structure by height according to some embodiments of this disclosure; and FIG. 6 is a top view of an unloaded pallet conveying line of a conveying logistics line in three control modes according to some embodiments of this disclosure.

As shown in FIG. 1 to FIG. 4, an embodiment of this disclosure provides a conveying logistics line including an unloaded pallet conveying line 5, a first loaded pallet conveying line 3, a second loaded pallet conveying line 4, a merging conveying line 63, a workpiece retrieval station 7, and an electrical control module. Along an extension direction of the unloaded pallet conveying line 5, a plurality of workpiece manufacturing machines are sequentially distributed. The plurality of workpiece manufacturing machines include at least one first workpiece manufacturing machine 1 and at least one second workpiece manufacturing machine 2 alternately distributed. The unloaded pallet conveying line 5 is connected to an input end of each of the workpiece manufacturing machines, and the unloaded pallet conveying line 5 is configured to be capable of conveying unloaded pallets 8 without workpieces to each of the workpiece manufacturing machines; the first loaded pallet conveying line 3 is connected to an output end of each of the first workpiece manufacturing machines 1, where the first loaded pallet conveying line 3 is configured to be capable of receiving and conveying loaded pallets 9 with first workpieces from each of the first workpiece manufacturing machines 1; the second loaded pallet conveying line 4 is connected to an output end of each of the second workpiece manufacturing machines 2, where the second loaded pallet conveying line 4 is configured to be capable of receiving and conveying loaded pallets 9 with second workpieces from each of the second workpiece manufacturing machines 2; the merging conveying line 63 is connected to the first loaded pallet conveying line 3 and the second loaded pallet conveying line 4, where the merging conveying line 63 receives the loaded pallets 9 from the first loaded pallet conveying line 3 and the loaded pallets 9 from the second loaded pallet conveying line 4 according to a preset sequence; an input end and output end of the workpiece retrieval station 7 are respectively connected to an output end of the merging conveying line 63 and an input end of the unloaded pallet conveying line 5; and the electrical control module is communicatively connected to the unloaded pallet conveying line 5, configured to control quantities of unloaded pallets 8 conveyed by the unloaded pallet conveying line 5 to each of the first workpiece manufacturing machines 1 and each of the second workpiece manufacturing machines 2 based on real-time quantity information of the loaded pallets 9 on the first loaded pallet conveying line 3 and the second loaded pallet conveying line 4, so as to achieve a stable conveying state within a set operating time of the conveying logistics line, where the stable conveying state includes a real-time quantity of the loaded pallets 9 on the first loaded pallet conveying line 3 and a real-time quantity of the loaded pallets 9 on the second loaded pallet conveying line 4 being within a first set range and a second set range, respectively.

When the conveying logistics line is applied to manufacture battery cells, the first workpiece manufacturing machine 1 is used to wind type-A bare cells, and the second workpiece manufacturing machine 2 is used to wind type-B bare cells. The unloaded pallet conveying line 5 conveys unloaded pallets 8 to each of the first workpiece manufacturing machines 1 and each of the second workpiece manufacturing machines 2. The unloaded pallets 8 conveyed into the first workpiece manufacturing machine 1 receive type-A bare cells wound by the first workpiece manufacturing machine 1 and are then conveyed to the first loaded pallet conveying line 3. The unloaded pallets 8 conveyed into the second workpiece manufacturing machine 2 receive type-B bare cells wound by the second workpiece manufacturing machine 2 and are then conveyed to the second loaded pallet conveying line 4. The loaded pallets 9 on the first loaded pallet conveying line 3 and the loaded pallets 9 on the second loaded pallet conveying line 4 are conveyed one by one to the merging conveying line 63 according to a preset sequence, so that type-A bare cells and type-B bare cells on the merging conveying line 63 are arranged in the sequence of bare cells within a battery cell. The bare cells arranged in sequence are sequentially retrieved and moved to a pairing and integration apparatus for pairing and integration. After the bare cells on the merging conveying line 63 are retrieved, the unloaded pallets 8 remain, and the unloaded pallets 8 are returned from the merging conveying line 63 to the unloaded pallet conveying line 5. This cycle realizes the conveying of bare cells.

For example, during the conveying process, if the quantities of loaded pallets 9 on the first loaded pallet conveying line 3 and the second loaded pallet conveying line 4 are relatively balanced, the electrical control module controls the unloaded pallet conveying line 5 to convey unloaded pallets 8 to each of the first workpiece manufacturing machines 1 and each of the second workpiece manufacturing machines 2 at a relatively balanced ratio. If one or more of a certain type of workpiece manufacturing machine are in a material-switching standby state, which reduces the output speed of that type of bare cell, it will cause a significant difference in the quantities of loaded pallets 9 on the first loaded pallet conveying line 3 and the second loaded pallet conveying line 4, to be specific, a larger quantity of bare cells on one loaded pallet conveying line and a smaller quantity of bare cells on the other loaded pallet conveying line. At this time, the electrical control module increases the quantity of unloaded pallets 8 allocated to the workpiece manufacturing machines corresponding to the bare cells with a smaller quantity and reduces the quantity of unloaded pallets 8 allocated to the workpiece manufacturing machines corresponding to the bare cells with a larger quantity, so that the bare cells with a smaller quantity are produced at a normal speed, while the bare cells with a larger quantity are produced at a speed slower than normal. Operating in this mode for a certain period can bring the real-time quantities of the two types of bare cells to a basic balance, enabling stable and continuous production of battery cells and thus improving the production efficiency of battery cells.

The embodiments of this disclosure impose no particular limitation on the structures of the constituent elements such as workpiece manufacturing machines, conveying lines, and pallets themselves, provided that they can achieve their respective basic functions, and known technologies may be adopted, for example.

The electrical control module can be implemented through electrical control hardware circuits, in-place sensors, PLC programs, and the like.

The conveying logistics line may have only one unloaded pallet conveying line 5 for conveying unloaded pallets, which reduces the quantity of conveying lines and simplifying the structure of the conveying logistics line. During the foregoing conveying process, the electrical control module controls, based on the real-time quantities of two types of bare cells, the quantity of unloaded pallets 8 conveyed to each of the workpiece manufacturing machines, which affects the output speeds of the two types of bare cells. As a result, the difference in the real-time quantities of the two types of bare cells can be reduced over time, achieving a stable conveying state. This enables stable and continuous production of battery cells and thus improves the production efficiency of battery cells.

In some embodiments of this disclosure, as shown in FIG. 5, the first loaded pallet conveying line 3 is provided with a first pallet quantity detection assembly, where the first pallet quantity detection assembly is configured to detect a relationship between the real-time quantity of the loaded pallets 9 on the first loaded pallet conveying line 3 and an upper limit value and lower limit value of the first set range; the second loaded pallet conveying line 4 is provided with a second pallet quantity detection assembly, where the second pallet quantity detection assembly is configured to detect a relationship between the real-time quantity of the loaded pallets 9 on the second loaded pallet conveying line 4 and an upper limit value and lower limit value of the second set range; and the electrical control module is communicatively connected to the first pallet quantity detection assembly and the second pallet quantity detection assembly, and capable of controlling, based on data information detected by the first pallet quantity detection assembly and the second pallet quantity detection assembly, quantities of unloaded pallets 8 conveyed by the unloaded pallet conveying line 5 to each of the first workpiece manufacturing machines 1 and each of the second workpiece manufacturing machines 2.

The first pallet quantity detection assembly can detect whether the quantity of bare cells on the first loaded pallet conveying line is less than the lower limit value of the first set range, greater than the upper limit value of the first set range, or within the first set range. The arranged second pallet quantity detection assembly can detect whether the quantity of loaded pallets on the second loaded pallet conveying line is less than the lower limit value of the second set range, greater than the upper limit value of the second set range, or within the second set range. In this way, real-time quantity information of the loaded pallets 9 is obtained. This provides a basis for the electrical control module to control the unloaded pallet conveying line 5, and enables the unloaded pallet conveying line 5 to allocate appropriate quantities of unloaded pallets 8 to the two types of workpiece manufacturing machines. Thus, the output speeds of the two types of workpiece manufacturing machines are adjusted. After operating for a certain period, the real-time quantities of the two types of bare cells can reach a basic balance, enabling stable and continuous production of battery cells, and thereby improving the production efficiency of battery cells.

In some embodiments of this disclosure, as shown in FIG. 5, the first pallet quantity detection assembly includes a first underload detection sensor 11 and a first full-load detection sensor 12, where the first underload detection sensor 11 and the first full-load detection sensor 12 are sequentially arranged along a conveying path of the first loaded pallet conveying line 3; the first underload detection sensor 11 is triggered under the condition that the real-time quantity of the loaded pallets 9 on the first loaded pallet conveying line 3 is less than the lower limit value of the first set range; and the first full-load detection sensor 12 is triggered under the condition that the real-time quantity of the loaded pallets 9 on the first loaded pallet conveying line 3 is greater than the upper limit value of the first set range; and the second pallet quantity detection assembly includes a second underload detection sensor 13 and a second full-load detection sensor 14, where the second underload detection sensor 13 and the second full-load detection sensor 14 are sequentially arranged along a conveying path of the second loaded pallet conveying line 4; the second underload detection sensor 13 is triggered under the condition that the real-time quantity of the loaded pallets 9 on the second loaded pallet conveying line 4 is less than the lower limit value of the second set range; and the second full-load detection sensor 14 is triggered under the condition that the real-time quantity of the loaded pallets 9 on the second loaded pallet conveying line 4 is greater than the upper limit value of the second set range.

The first underload detection sensor 11, the first full-load detection sensor 12, the second underload detection sensor 13, and the second full-load detection sensor 14 may be photoelectric sensors, for example, photoelectric sensors, photoelectric switches, or laser rangefinders; the first underload detection sensor 11, the first full-load detection sensor 12, the second underload detection sensor 13, and the second full-load detection sensor 14 may alternatively be pressure sensors, ultrasonic sensors, or the like.

For example, the first underload detection sensor 11 is a through-beam photoelectric sensor. The loaded pallets 9 on the first loaded pallet conveying line 3 queue up starting from an output end of the first loaded pallet conveying line 3. When the queued line passes through a detection area of the first underload detection sensor 11, it indicates that the real-time quantity of the loaded pallets 9 on the first loaded pallet conveying line 3 is greater than the lower limit value of the first set range. When the queued line does not pass through the detection area of the first underload detection sensor 11, it indicates that the real-time quantity of the loaded pallets 9 on the first loaded pallet conveying line 3 is less than the lower limit value of the first set range. In this case, the first underload detection sensor 11 is triggered and sends a trigger signal to the electrical control module. It should be noted that, since the first loaded pallet conveying line 3 continuously receives loaded pallets 9 output by the first workpiece manufacturing machine 1, loaded pallets 9 intermittently passes through the detection area of the first underload detection sensor 11. To distinguish whether the loaded pallets 9 passing through the detection area of the first underload detection sensor 11 are already queued or momentarily passing through, a time threshold is set for the first underload detection sensor 11 to detect the presence of loaded pallets 9. If the first underload detection sensor 11 detects the presence of a loaded pallet 9 for a short time, for example, the loaded pallet 9 passes after 5 seconds, this case is deemed as the loaded pallet 9 temporarily passing through, indicating that the length of the queued line is short and the loaded pallet 9 does not pass through the detection area of the first underload detection sensor 11. At this time, the quantity of loaded pallets 9 is too small, and the first underload detection sensor 11 is triggered. If the first underload detection sensor 11 detects the presence of a loaded pallet 9 for a long time, for example, the presence of the loaded pallet 9 lasts for 5 seconds or more, it indicates that the queued line of loaded pallets 9 has entered the detection area of the first underload detection sensor 11, the queue of loaded pallets 9 is relatively long, suggesting a relatively large quantity of loaded pallets 9, and the first underload detection sensor 11 is not triggered. Correspondingly, the first full-load detection sensor 12 is a through-beam photoelectric sensor. The loaded pallets 9 on the first loaded pallet conveying line 3 queue up starting from the output end of the first loaded pallet conveying line 3. When the queued line does not pass through a detection area of the first full-load detection sensor 12, it indicates that the real-time quantity of the loaded pallets 9 on the first loaded pallet conveying line 3 is less than the upper limit value of the first set range. When the queued line passes through the detection area of the first full-load detection sensor 12, it indicates that the real-time quantity of the loaded pallets 9 on the first loaded pallet conveying line 3 is greater than the upper limit value of the first set range. In this case, the first full-load detection sensor 12 is triggered and sends a trigger signal to the electrical control module. Correspondingly, the triggering principle of the second underload detection sensor 13 is similar to that of the first underload detection sensor 11, and the triggering principle of the second full-load detection sensor 14 is similar to that of the first full-load detection sensor 12. The triggering principles of the second underload detection sensor 13 and the second full-load detection sensor 14 will not be described here again.

In this way, when none of the four detection sensors are triggered, the real-time quantities of type-A bare cells and type-B bare cells are respectively within the first set range and the second set range. At this time, the conveying logistics line is in a stable conveying state, and requires a balanced allocation method to distribute unloaded pallets to the two types of workpiece manufacturing machines. When the first underload detection sensor 11 is triggered and the second full-load detection sensor 14 is triggered, the conveying logistics line is in an unbalanced state in which type-A bare cells are far fewer than type-B bare cells; when the first full-load detection sensor 12 is triggered and the second underload detection sensor 13 is triggered, the conveying logistics line is in an unbalanced state in which type-A bare cells are far more than type-B bare cells, and requires an allocation method with a significant quantity difference to distribute unloaded pallets to the two types of workpiece manufacturing machines; when both the first underload detection sensor 11 and the second underload detection sensor 13 are triggered, or both the first full-load detection sensor 12 and the second full-load detection sensor 14 are triggered, it indicates that the quantities of unloaded pallets 8 allocated to the two types of workpiece manufacturing machines are relatively balanced, and the conveying logistics line is in a balanced conveying state, and thus requires a balanced allocation method.

If the conveying logistics line is in a stable conveying state or a balanced conveying state, the electrical control module controls the unloaded pallet conveying line 5 to convey unloaded pallets 8 to each of the first workpiece manufacturing machines 1 and each of the second workpiece manufacturing machines 2 at a relatively balanced ratio. If the conveying logistics line is in an unbalanced state in which the quantity of type-A bare cells is far less than that of type-B bare cells, the electrical control module controls the unloaded pallet conveying line 5 to allocate more unloaded pallets 8 to the first workpiece manufacturing machines 1 and fewer unloaded pallets 8 to the second workpiece manufacturing machines 2. If the conveying logistics line is in an unbalanced state in which the quantity of type-A bare cells is far greater than that of type-B bare cells, the electrical control module controls the unloaded pallet conveying line 5 to allocate fewer unloaded pallets 8 to the first workpiece manufacturing machines 1 and more unloaded pallets 8 to the second workpiece manufacturing machines 2. In this way, the bare cells with a smaller quantity can be produced at a normal speed, while the bare cells with a larger quantity can be produced at a slower speed. After the conveying logistics line operates in this mode for a certain period of time, it can reach a stable conveying state, thus enabling the stable and continuous production of battery cells and further improving the production efficiency of battery cells.

In this way, the first underload detection sensor 11 and the first full-load detection sensor 12 work in cooperation to detect whether the real-time quantity of type-A bare cells is within the first set range, less than the lower limit value of the first set range, or greater than the upper limit value of the first set range, in other words, detecting the real-time quantity information of type-A bare cells. The second underload detection sensor 13 and the second full-load detection sensor 14 work in cooperation to detect whether the real-time quantity of type-B bare cells is within the second set range, less than the lower limit value of the second set range, or greater than the upper limit value of the second set range, in other words, detecting the real-time quantity information of type-B bare cells. The real-time quantity information of type-A bare cells and type-B bare cells provides a basis for the electrical control module to control the unloaded pallet conveying line 5, enabling the unloaded pallet conveying line to allocate an appropriate quantity of unloaded pallets to the two types of workpiece manufacturing machines, thus adjusting the production speeds of the two types of workpiece manufacturing machines. After operating for a certain period of time, the real-time quantities of the two types of bare cells can reach a basic balance. In this way, the stable and continuous production of battery cells can be ensured, and the production efficiency of battery cells can be improved.

In some embodiments of this disclosure, the electrical control module has a first control mode, a second control mode, and a third control mode. The electrical control module adopts the first control mode under the condition that the real-time quantity of the loaded pallets 9 on the first loaded pallet conveying line 3 and the real-time quantity of the loaded pallets 9 on the second loaded pallet conveying line 4 are respectively within the first set range and the second set range, or respectively less than the lower limit value of the first set range and the lower limit value of the second set range, or respectively greater than the upper limit value of the first set range and the upper limit value of the second set range, where the first control mode also serves as the initial default mode. The electrical control module adopts the second control mode under the condition that the real-time quantity of the loaded pallets 9 on the first loaded pallet conveying line 3 is less than the lower limit value of the first set range and the real-time quantity of the loaded pallets 9 on the second loaded pallet conveying line 4 is greater than the upper limit value of the second set range. The electrical control module adopts the third control mode under the condition that the real-time quantity of the loaded pallets 9 on the first loaded pallet conveying line 3 is greater than the upper limit value of the first set range and the real-time quantity of the loaded pallets 9 on the second loaded pallet conveying line 4 is less than the lower limit value of the second set range.

The real-time quantity of the loaded pallets 9 on the first loaded pallet conveying line 3 being within the first set range includes the real-time quantity of the loaded pallets 9 on the first loaded pallet conveying line 3 being equal to the upper limit value of the first set range, the real-time quantity of the loaded pallets 9 being equal to the lower limit value of the first set range, and the real-time quantity of the loaded pallets 9 being any value between the upper limit value and the lower limit value. The real-time quantity of the loaded pallets 9 on the second loaded pallet conveying line 4 being within the second set range includes the real-time quantity of the loaded pallets 9 on the second loaded pallet conveying line 4 being equal to the upper limit value of the second set range, the real-time quantity of the loaded pallets 9 being equal to the lower limit value of the second set range, and the real-time quantity of the loaded pallets 9 being any value between the upper limit value and the lower limit value. In other words, the electrical control module adopts the first control mode under the condition that the real-time quantity of the loaded pallets 9 on the first loaded pallet conveying line 3 and the real-time quantity of the loaded pallets 9 on the second loaded pallet conveying line 4 are respectively at the upper limit value of the first set range and the upper limit value of the second set range, or respectively at the lower limit value of the first set range and the lower limit value of the second set range, or respectively at the upper limit value of the first set range and the lower limit value of the second set range, or respectively at the lower limit value of the first set range and the upper limit value of the second set range, or both between the upper limit value and the lower limit value of their respective set ranges.

The foregoing three control modes switch based on the real-time quantity information of the loaded pallets 9, enabling the conveying logistics line in an unbalanced state to achieve a stable conveying state within a set time, thereby ensuring stable and continuous production of battery cells and further improving the production efficiency of battery cells.

In some embodiments of this disclosure, referring to (a) in FIG. 6, in the first control mode, the electrical control module controls the unloaded pallet conveying line 5 to sequentially convey a set quantity of unloaded pallets 8 to workpiece manufacturing machines one by one, starting from a first machine and ending with a last machine; after all the workpiece manufacturing machines have received the set quantity of unloaded pallets 8, the unloaded pallet conveying line cyclically add one unloaded pallet 8 to each of these workpiece manufacturing machines starting from the first machine and ending with the last machine until a quantity of unloaded pallets 8 cached at each workpiece manufacturing machine reaches a maximum allowable cache capacity.

Referring to (b) in FIG. 6, in the second control mode, the electrical control module controls the unloaded pallet conveying line 5 to preferentially input unloaded pallets 8 to the first workpiece manufacturing machines 1, maintaining a quantity of unloaded pallets 8 cached at each of the first workpiece manufacturing machines 1 at a maximum allowable cache capacity, and convey at least a set quantity of unloaded pallets 8 to the second workpiece manufacturing machines 2 and temporarily store these unloaded pallets 8 outside an entrance of the second workpiece manufacturing machines 2. The unloaded pallets 8 temporarily stored outside the entrance of the second workpiece manufacturing machines 2 are used to be input into the second workpiece manufacturing machines 2 when the conveying logistics line switched from the second control mode to the first control mode.

Referring to (c) in FIG. 6, in the third control mode, the electrical control module controls the unloaded pallet conveying line 5 to preferentially input unloaded pallets 8 to the second workpiece manufacturing machines 2, maintaining a quantity of unloaded pallets 8 cached at each of the second workpiece manufacturing machines 2 at a maximum allowable cache capacity, and convey at least a set quantity of unloaded pallets 8 to the first workpiece manufacturing machines 1 and temporarily store these unloaded pallets 8 outside an entrance of the first workpiece manufacturing machines 1. The unloaded pallets 8 temporarily stored outside the entrance of the first workpiece manufacturing machines 1 are used to be input into the first workpiece manufacturing machines 1 when the conveying logistics line switched from the third control mode to the first control mode.

It can be understood that the maximum allowable cache capacity refers to a maximum quantity of unloaded pallets 8 that an entrance of a workpiece manufacturing machine can accommodate simultaneously. Since the sizes of unloaded pallets 8 vary with the sizes of bare cells, it is evident that, without changing the workpiece manufacturing machine, the maximum allowable cache capacity differs for unloaded pallets 8 of different sizes. That is, the maximum allowable cache capacity changes with the sizes of the bare cells. The maximum allowable cache capacity is determined based on the size of the conveying path of the workpiece manufacturing machine and the sizes of the unloaded pallets 8 adapted to the bare cells, and specific values thereof are not specifically limited herein.

Inputting unloaded pallets 8 to a workpiece manufacturing machine refers to conveying the unloaded pallets 8 into the workpiece manufacturing machine, where the unloaded pallets 8 receive wound bare cells as the workpiece manufacturing machine operates, enabling continuous operation of the workpiece manufacturing machine. Temporarily storing unloaded pallets 8 outside the entrance of a workpiece manufacturing machine refers to conveying the unloaded pallets 8 to the outside of the entrance of the workpiece manufacturing machine without entering the workpiece manufacturing machine. In this case, the workpiece manufacturing machine pauses operation due to the absence of unloaded pallets 8 to receive bare cells, thus reducing the output speed of bare cells for this type of workpiece manufacturing machine. Meanwhile, the other type of workpiece manufacturing machine continues stable operation due to the normal input of unloaded pallets 8, maintaining the output speed of bare cells for that type of workpiece manufacturing machine unchanged. As a result, after operating for a period, the real-time quantities of the two types of bare cells can reach a balance, to be specific, the real-time quantity of the loaded pallets 9 on the first loaded pallet conveying line 3 and the real-time quantity of the loaded pallets 9 on the second loaded pallet conveying line 4 are respectively within the first set range and the second set range.

After the real-time quantities of the two types of bare cells reach a balanced state, the unloaded pallets 8 temporarily stored outside the entrance of the workpiece manufacturing machine are input into the workpiece manufacturing machine, enabling the workpiece manufacturing machine to start operating and produce bare cells at a normal speed. Temporarily storing unloaded pallets 8 outside the entrance of the workpiece manufacturing machine is intended to input these unloaded pallets 8 into the workpiece manufacturing machine promptly after control modes switch, enabling the workpiece manufacturing machine to operate in a timely manner and preventing the output speed of that type of bare cells from being affected due to delayed input of unloaded pallets 8.

The foregoing describes specific operating methods of the three control modes, which can ensure that, within the set operating time of the conveying logistics line, the real-time quantity of the loaded pallets 9 on the first loaded pallet conveying line 3 and the real-time quantity of the loaded pallets 9 on the second loaded pallet conveying line 4 are respectively within the first set range and the second set range. In some embodiments of this disclosure, the set quantity includes 3.

Temporarily conveying three unloaded pallets 8 to a workpiece manufacturing machine can both meet the short-term demand for unloaded pallets 8 by the workpiece manufacturing machine and leave a sufficient quantity of unloaded pallets 8 for other workpiece manufacturing machines, ensuring adequate circulation of unloaded pallets 8 and thus enabling normal operation of the conveying logistics line.

In some embodiments of this disclosure, the set quantity may be 2, 4, 5, or 6, and of course, may alternatively be other quantities, which are not specifically limited herein.

In some embodiments of this disclosure, as shown in FIG. 1 and FIG. 2, a conveying path of the first loaded pallet conveying line 3, a conveying path of the second loaded pallet conveying line 4, and a conveying path of the unloaded pallet conveying line 5 are sequentially distributed from top to bottom, and the workpiece manufacturing machines are correspondingly arranged on the same side of the first loaded pallet conveying line 3, the second loaded pallet conveying line 4, and the unloaded pallet conveying line 5.

With this arrangement, the first loaded pallet conveying line 3, the second loaded pallet conveying line 4, and the unloaded pallet conveying line 5 occupy less space. Moreover, distances between the three conveying lines, namely, the first loaded pallet conveying line 3, the second loaded pallet conveying line 4, and the unloaded pallet conveying line 5, and the workpiece manufacturing machines are relatively short, reducing the space occupied by the conveying logistics line.

In some embodiments of this disclosure, as shown in FIG. 5, the conveying path of the second loaded pallet conveying line 4, a conveying path of the merging conveying line 63, and a conveying path of the workpiece retrieval station 7 are at the same height; the conveying logistics line further includes a first lifting mechanism 61, a third loaded pallet conveying line 62, and a second lifting mechanism 64, where a conveying path of the third loaded pallet conveying line 62 and the conveying path of the second loaded pallet conveying line 4 are at the same height, a top input end and a bottom output end of the first lifting mechanism 61 are respectively connected to an output end of the first loaded pallet conveying line 3 and an input end of the third loaded pallet conveying line 62, and an output end of the third loaded pallet conveying line 62 is connected to an input end of the merging conveying line 63, and a top input end and a bottom output end of the second lifting mechanism 64 are respectively connected to an output end of the workpiece retrieval station 7 and an input end of the unloaded pallet conveying line 5.

Loaded pallets 9 with first workpieces are conveyed by the first loaded pallet conveying line 3 to the first lifting mechanism 61, and after being lowered by the first lifting mechanism 61, they are conveyed to the third loaded pallet conveying line 62. The loaded pallets 9 on the third loaded pallet conveying line 62 and the loaded pallets 9 on the first loaded pallet conveying line 3 are conveyed to the merging conveying line 63 according to a preset sequence. The loaded pallets 9 arranged in sequence on the merging conveying line 63 are conveyed to the workpiece retrieval station 7, where bare cells in the loaded pallets 9 on the workpiece retrieval station 7 are retrieved, and unloaded pallets 8 at the workpiece retrieval station 7 remain. The unloaded pallets 8 enter the second lifting mechanism 64 from the workpiece retrieval station 7, viand after being lowered by the second lifting mechanism 64, they are conveyed to the unloaded pallet conveying line 5. After that, the unloaded pallet conveying line 5 allocates unloaded pallets 8 to each workpiece manufacturing machine.

In this way, cyclic conveying of pallets is completed, thereby realizing transportation of workpieces. The conveying logistics line has a simple structure, a reasonable layout, and a small space occupied.

In some embodiments of this disclosure, the workpieces include bare cells.

The conveying logistics line is applied to a solution for conveying bare cells, realizing the conveying of bare cells and enabling stable and continuous production of battery cells, thereby improving the production efficiency of battery cells.

Figure 8:
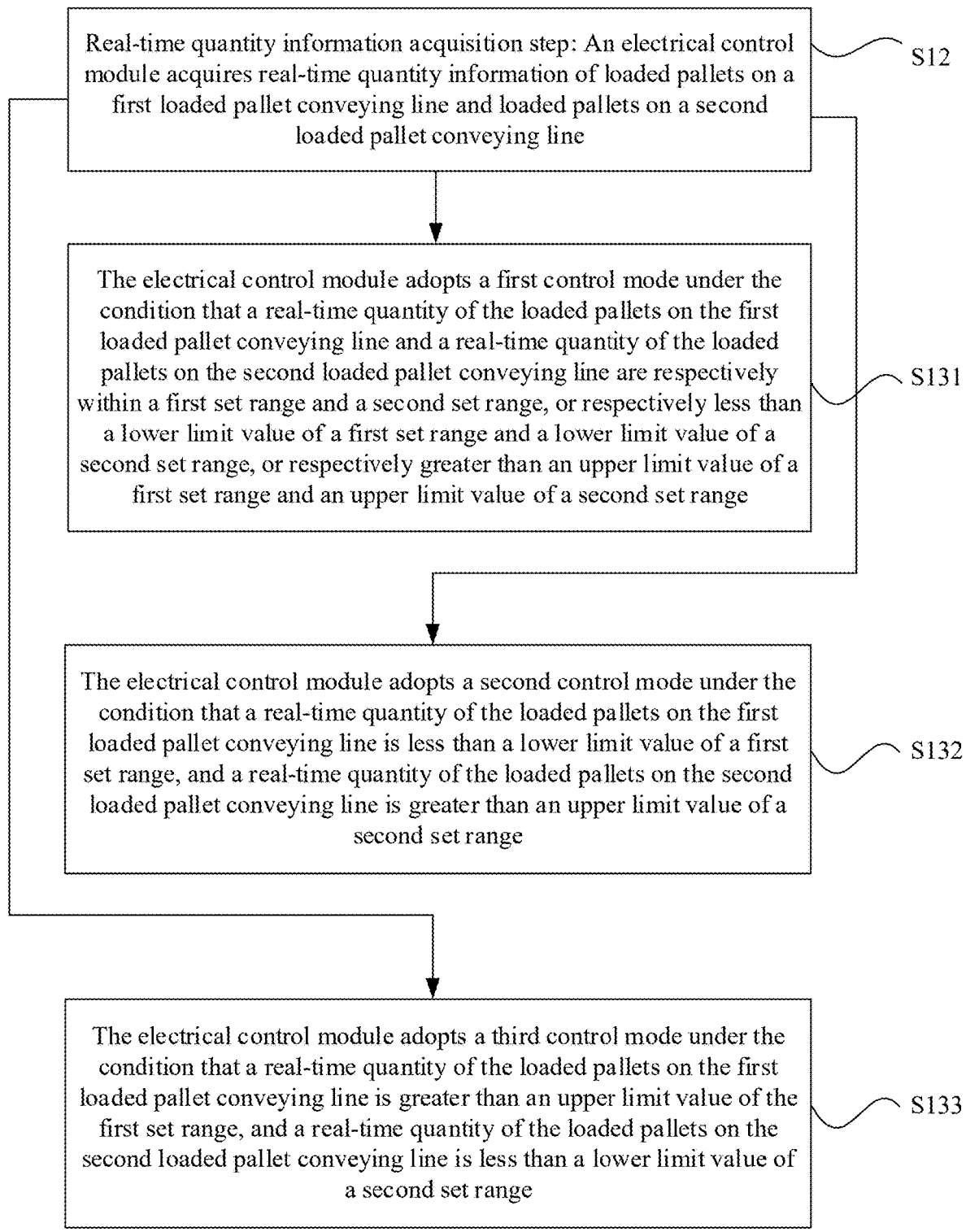
FIG. 8 is a schematic flowchart of a pallet logistics control method according to some other embodiments of this disclosure.

FIG. 7 is a schematic flowchart of a pallet logistics control method according to some embodiments of this disclosure; FIG. 8 is a schematic flowchart of a pallet logistics control method according to some other embodiments of this disclosure.

An embodiment of this disclosure further provides a pallet logistics control method applied to a conveying logistics line, where the conveying logistics line includes an unloaded pallet conveying line 5, a first loaded pallet conveying line 3, a second loaded pallet conveying line 4, a merging conveying line 63, a workpiece retrieval station 7, and an electrical control module. Along an extension direction of the unloaded pallet conveying line 5, a plurality of workpiece manufacturing machines are sequentially distributed, and the plurality of workpiece manufacturing machines include at least one first workpiece manufacturing machine 1 and at least one second workpiece manufacturing machine 2 that are alternately distributed. The unloaded pallet conveying line 5 is connected to an input end of each of the workpiece manufacturing machines, and the unloaded pallet conveying line 5 is configured to convey unloaded pallets 8 without workpieces to each of the workpiece manufacturing machines. The first loaded pallet conveying line 3 is connected to an output end of each of the first workpiece manufacturing machines 1, and the first loaded pallet conveying line 3 is configured to receive and convey loaded pallets 9 with first workpieces from each of the first workpiece manufacturing machines 1. The second loaded pallet conveying line 4 is connected to an output end of each of the second workpiece manufacturing machines 2, and the second loaded pallet conveying line 4 is configured to receive and convey loaded pallets 9 with second workpieces from each of the second workpiece manufacturing machines 2. The merging conveying line 63 is connected to the first loaded pallet conveying line 3 and the second loaded pallet conveying line 4, and the merging conveying line 63 receives the loaded pallets 9 from the first loaded pallet conveying line 3 and the loaded pallets 9 from the second loaded pallet conveying line 4 according to a preset sequence. An input end and output end of the workpiece retrieval station 7 are respectively connected to an output end of the merging conveying line 63 and an input end of the unloaded pallet conveying line 5. The electrical control module is communicatively connected to the unloaded pallet conveying line 5, and the electrical control module controls the unloaded pallet conveying line 5 using the control method so that the conveying logistics line achieves a stable conveying state within a set operating time, where the stable conveying state includes a real-time quantity of the loaded pallets on the first loaded pallet conveying line and a real-time quantity of the loaded pallets on the second loaded pallet conveying line being within a first set range and a second set range, respectively.

As shown in FIG. 7, the control method includes the following steps.

- S12. Real-time quantity information acquisition step: The electrical control module acquires real-time quantity information of the loaded pallets on the first loaded pallet conveying line and the loaded pallets on the second loaded pallet conveying line.
- S13. Unloaded pallet allocation step: The electrical control module controls, based on the real-time quantity information, quantities of unloaded pallets conveyed by the unloaded pallet conveying line to each of the first workpiece manufacturing machines and each of the second workpiece manufacturing machines.

During the battery cell manufacturing process, when the pallet logistics control method is applied to control the pallet transfer for conveying bare cells, the first workpiece manufacturing machine 1 is used to wind type-A bare cells, and the second workpiece manufacturing machine 2 is used to wind type-B bare cells. The unloaded pallet conveying line 5 conveys unloaded pallets 8 to each of the first workpiece manufacturing machines 1 and each of the second workpiece manufacturing machines 2. The unloaded pallets 8 conveyed into the first workpiece manufacturing machine 1 receive type-A bare cells wound by the first workpiece manufacturing machine 1 and are then conveyed to the first loaded pallet conveying line 3. The unloaded pallets 8 conveyed into the second workpiece manufacturing machine 2 receive type-B bare cells wound by the second workpiece manufacturing machine 2 and are then conveyed to the second loaded pallet conveying line 4. The loaded pallets 9 on the first loaded pallet conveying line 3 and the loaded pallets 9 on the second loaded pallet conveying line 4 are conveyed one by one to the merging conveying line 63 according to a preset sequence, so that type-A bare cells and type-B bare cells on the merging conveying line 63 are arranged in the sequence of bare cells within a battery cell. The bare cells arranged in sequence are sequentially retrieved and moved to an integration apparatus for integration. After the bare cells on the merging conveying line 63 are retrieved, the unloaded pallets 8 remain, and the unloaded pallets 8 are returned from the merging conveying line 63 to the unloaded pallet conveying line 5. This cycle realizes the conveying of bare cells.

For example, if the real-time quantities of loaded pallets 9 on the first loaded pallet conveying line 3 and the second loaded pallet conveying line 4 are relatively balanced, the electrical control module controls the unloaded pallet conveying line 5 to convey unloaded pallets 8 to each of the first workpiece manufacturing machines 1 and each of the second workpiece manufacturing machines 2 at a relatively balanced ratio. If one or more of a certain type of workpiece manufacturing machine are in a material-switching standby state, which reduces the output speed of that type of bare cell, it will cause a significant difference in the quantities of loaded pallets 9 on the first loaded pallet conveying line 3 and the second loaded pallet conveying line 4, to be specific, a larger quantity of bare cells on one loaded pallet conveying line and a smaller quantity of bare cells on the other loaded pallet conveying line. At this time, the electrical control module increases the quantity of unloaded pallets 8 allocated to the workpiece manufacturing machines corresponding to the bare cells with a smaller quantity and reduces the quantity of unloaded pallets 8 allocated to the workpiece manufacturing machines corresponding to the bare cells with a larger quantity, so that the bare cells with a smaller quantity are produced at a normal speed, while the bare cells with a larger quantity are produced at a slower speed. Operating in this mode for a certain period can bring the real-time quantities of the two types of bare cells to a basic balance, enabling stable and continuous production of battery cells and thus improving the production efficiency of battery cells.

During the foregoing conveying process, the electrical control module controls, based on the real-time quantities of two types of bare cells, the quantity of unloaded pallets 8 conveyed to each of the workpiece manufacturing machines, which affects the output speeds of the two types of bare cells. As a result, the difference in the real-time quantities of the two types of bare cells can be reduced over time, achieving a stable conveying state. This enables stable and continuous production of battery cells and thus improves the production efficiency of battery cells.

In some embodiments of this disclosure, the electrical control module has a first control mode, a second control mode, and a third control mode, where the first control mode serves as an initial default mode. As shown in FIG. 8, the unloaded pallet allocation step includes the following steps.

- S131. The electrical control module adopts the first control mode under the condition that the real-time quantity of the loaded pallets 9 on the first loaded pallet conveying line 3 and the real-time quantity of the loaded pallets 9 on the second loaded pallet conveying line 4 are respectively within the first set range and the second set range, or respectively less than a lower limit value of the first set range and a lower limit value of the second set range, or respectively greater than an upper limit value of the first set range and an upper limit value of the second set range.
- S132. The electrical control module adopts the second control mode under the condition that the real-time quantity of the loaded pallets 9 on the first loaded pallet conveying line 3 is less than a lower limit value of the first set range, and the real-time quantity of the loaded pallets 9 on the second loaded pallet conveying line 4 is greater than an upper limit value of the second set range.
- S133. The electrical control module adopts the third control mode under the condition that the real-time quantity of the loaded pallets 9 on the first loaded pallet conveying line 3 is greater than an upper limit value of the first set range, and the real-time quantity of the loaded pallets 9 on the second loaded pallet conveying line 4 is less than a lower limit value of the second set range.

It can be understood that there is no fixed sequence among the three steps S131, S132, and S133, and the execution order of the three steps is selected based on the results obtained in step S12.

The foregoing three control modes switch based on the real-time quantity of the loaded pallets 9, enabling the conveying logistics line in an unbalanced state to achieve a stable conveying state within a set time, thereby ensuring stable and continuous production of battery cells and further improving the production efficiency of battery cells.

In some embodiments of this disclosure, in the first control mode, the electrical control module controls the unloaded pallet conveying line 5 to sequentially convey a set quantity of unloaded pallets 8 to workpiece manufacturing machines one by one, starting from a first machine and ending with a last machine; after all the workpiece manufacturing machines have received the set quantity of unloaded pallets 8, the unloaded pallet conveying line cyclically add one unloaded pallet 8 to each of the workpiece manufacturing machines starting from the first machine and ending with the last machine until a quantity of unloaded pallets 8 cached at each workpiece manufacturing machine reaches a maximum allowable cache capacity; in the second control mode, the electrical control module controls the unloaded pallet conveying line 5 to preferentially input unloaded pallets 8 to the first workpiece manufacturing machines 1, maintaining a quantity of unloaded pallets 8 cached at each of the first workpiece manufacturing machines 1 at a maximum allowable cache capacity, and convey at least a set quantity of unloaded pallets 8 to the second workpiece manufacturing machines 2 and temporarily store these unloaded pallets 8 outside an entrance of the second workpiece manufacturing machines 2; and in the third control mode, the electrical control module controls the unloaded pallet conveying line 5 to preferentially input unloaded pallets 8 to the second workpiece manufacturing machines 2, maintaining a quantity of unloaded pallets 8 cached at each of the second workpiece manufacturing machines 2 at a maximum allowable cache capacity, and convey at least a set quantity of unloaded pallets 8 to the first workpiece manufacturing machines 1 and temporarily store these unloaded pallets 8 outside an entrance of the first workpiece manufacturing machines 1; where the set quantity includes 3.

Inputting unloaded pallets 8 to a workpiece manufacturing machine refers to conveying the unloaded pallets 8 into the workpiece manufacturing machine, where the unloaded pallets 8 receive wound bare cells as the workpiece manufacturing machine operates, enabling continuous operation of the workpiece manufacturing machine. Temporarily storing unloaded pallets 8 outside the entrance of a workpiece manufacturing machine refers to conveying the unloaded pallets 8 to the outside of the entrance of the workpiece manufacturing machine without entering the workpiece manufacturing machine. In this case, the workpiece manufacturing machine pauses operation due to the absence of unloaded pallets 8 to receive bare cells, thus reducing the output speed of bare cells for this type of workpiece manufacturing machine. Meanwhile, the other type of workpiece manufacturing machine continues stable operation due to the normal input of unloaded pallets 8, maintaining the output speed of bare cells for that type of workpiece manufacturing machine unchanged. As a result, after operating for a period, the real-time quantities of the two types of bare cells can reach a balance, to be specific, the real-time quantity of the loaded pallets 9 on the first loaded pallet conveying line 3 and the real-time quantity of the loaded pallets 9 on the second loaded pallet conveying line 4 are respectively within the first set range and the second set range.

After the real-time quantities of the two types of bare cells reach a balanced state, the unloaded pallets 8 temporarily stored outside the entrance of the workpiece manufacturing machine are input into the workpiece manufacturing machine, enabling the workpiece manufacturing machine to start operating and produce bare cells at a normal speed. Temporarily storing unloaded pallets 8 outside the entrance of the workpiece manufacturing machine is intended to input these unloaded pallets 8 into the workpiece manufacturing machine promptly after control modes switch, enabling the workpiece manufacturing machine to operate in a timely manner and preventing the output speed of that type of bare cells from being affected due to delayed input of unloaded pallets 8.

The foregoing describes specific operating methods of the three control modes, which can ensure that, within the set operating time of the conveying logistics line, the real-time quantity of the loaded pallets 9 on the first loaded pallet conveying line 3 and the real-time quantity of the loaded pallets 9 on the second loaded pallet conveying line 4 are respectively within the first set range and the second set range.

In some embodiments of this disclosure, the workpieces include bare cells.

The conveying logistics line is applied to a solution for conveying bare cells, realizing the conveying of bare cells and enabling stable and continuous production of battery cells, thereby improving the production efficiency of battery cells.

Figure 9:
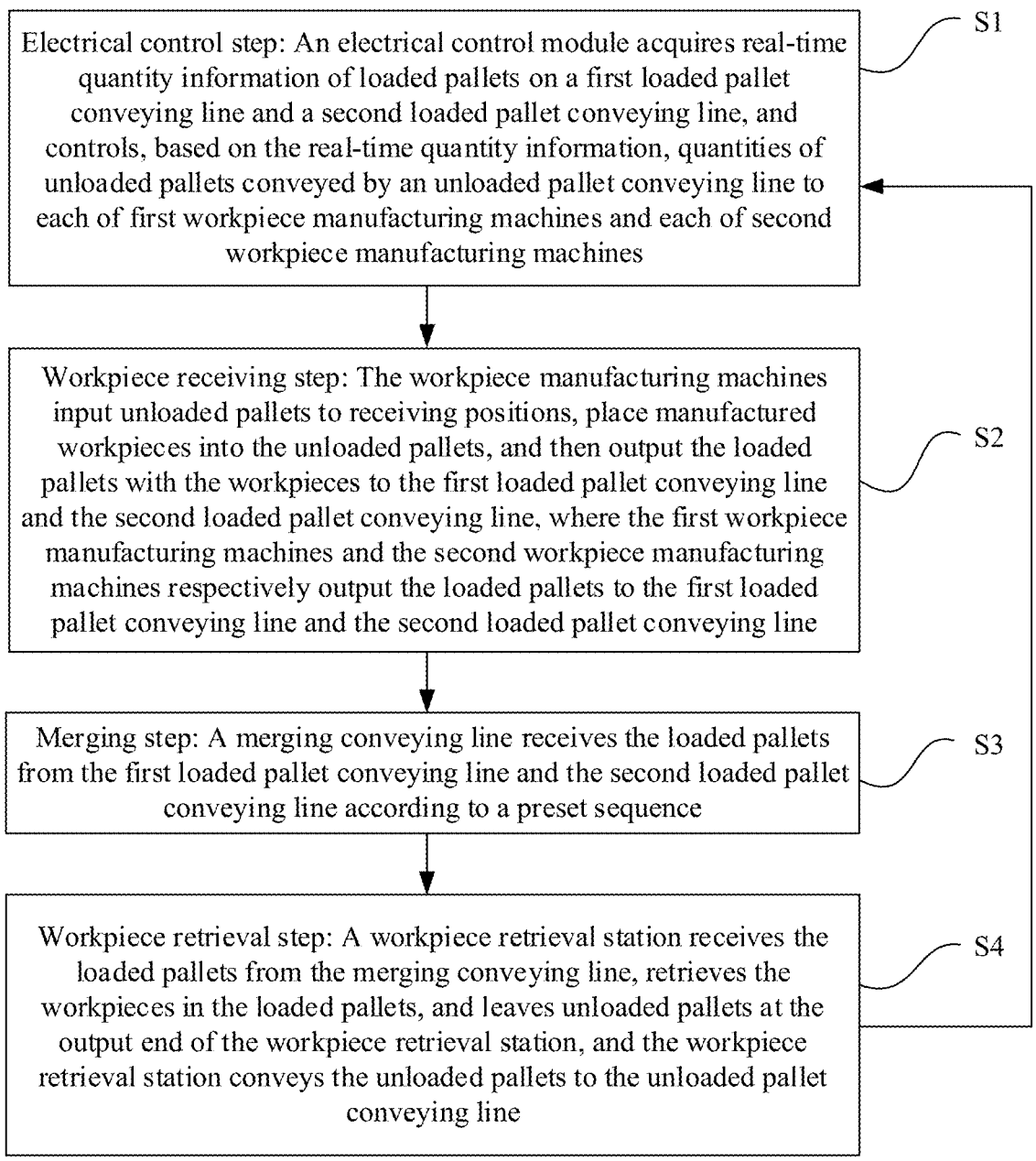
FIG. 9 is a schematic flowchart of a conveying logistics method according to some embodiments of this disclosure.
Figure 10:
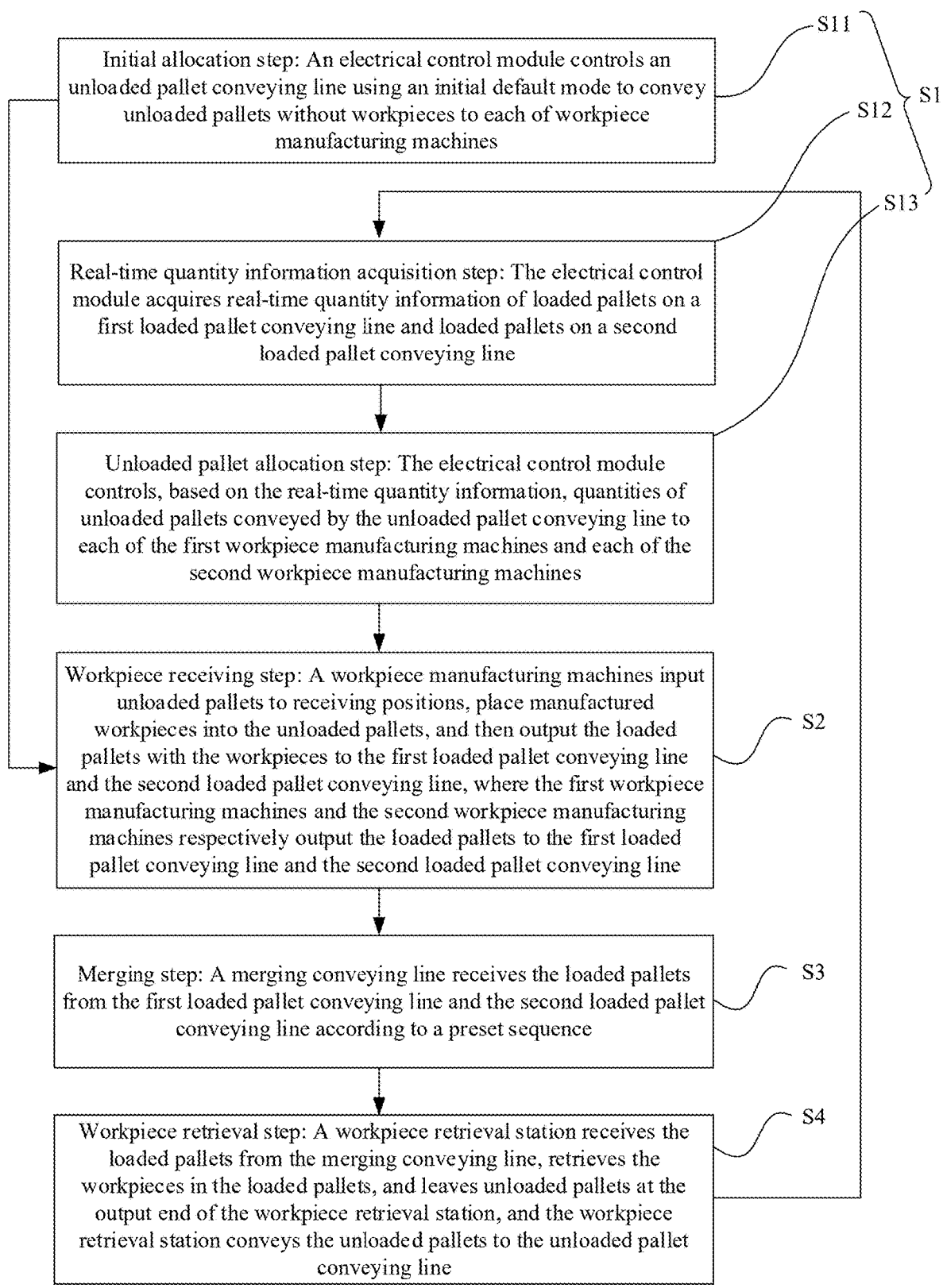
FIG. 10 is a schematic flowchart of a conveying logistics method according to some other embodiments of this disclosure.
Figure 11:
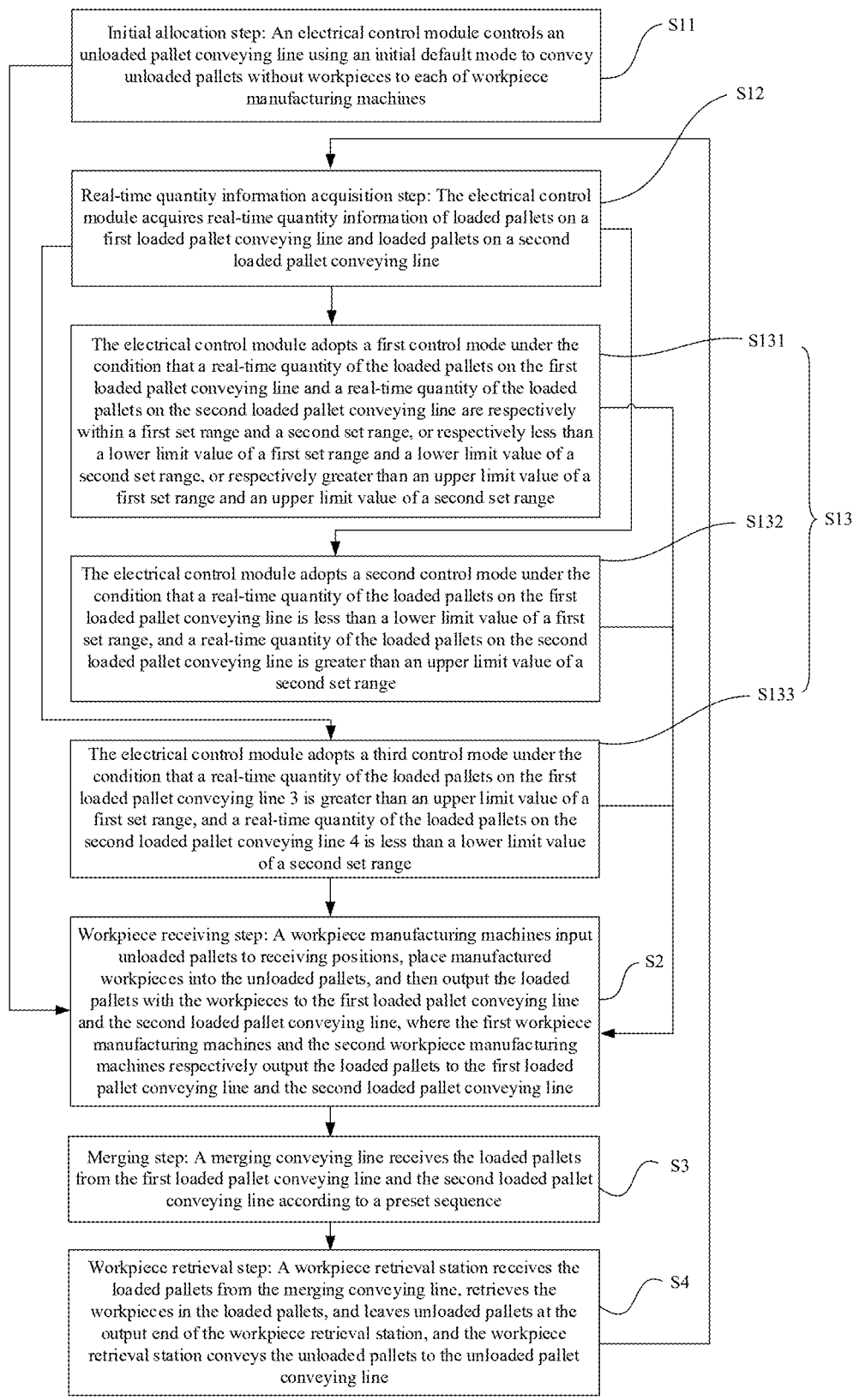
FIG. 11 is a schematic flowchart of a conveying logistics method according to still some other embodiments of this disclosure.

FIG. 9 is a schematic flowchart of a conveying logistics method according to some embodiments of this disclosure; FIG. 10 is a schematic flowchart of a conveying logistics method according to some other embodiments of this disclosure; and FIG. 11 is a schematic flowchart of a conveying logistics method according to still some other embodiments of this disclosure.

An embodiment of this disclosure further provides a conveying logistics method using a conveying logistics line, where the conveying logistics line using the conveying logistics method can achieve a stable conveying state within a set operating time, and the stable conveying state includes a real-time quantity of the loaded pallets on the first loaded pallet conveying line 3 and a real-time quantity of the loaded pallets on the second loaded pallet conveying line 4 being within a first set range and a second set range, respectively. The conveying logistics line includes an unloaded pallet conveying line 5, a first loaded pallet conveying line 3, a second loaded pallet conveying line 4, a merging conveying line 63, a workpiece retrieval station 7, and an electrical control module. Along an extension direction of the unloaded pallet conveying line 5, a plurality of workpiece manufacturing machines are sequentially distributed, and the plurality of workpiece manufacturing machines include at least one first workpiece manufacturing machine 1 and at least one second workpiece manufacturing machine 2 that are alternately distributed. The first loaded pallet conveying line 3 is connected to an output end of each of the first workpiece manufacturing machines 1, and the first loaded pallet conveying line 3 is configured to receive and convey loaded pallets 9 with first workpieces from each of the first workpiece manufacturing machines 1. The second loaded pallet conveying line 4 is connected to an output end of each of the second workpiece manufacturing machines 2, and the second loaded pallet conveying line 4 is configured to receive and convey loaded pallets 9 with second workpieces from each of the second workpiece manufacturing machines 2. The merging conveying line 63 is connected to the first loaded pallet conveying line 3 and the second loaded pallet conveying line 4. An input end and an output end of the workpiece retrieval station 7 are respectively connected to an output end of the merging conveying line 63 and an input end of the unloaded pallet conveying line 5. The electrical control module is communicatively connected to the unloaded pallet conveying line 5.

As shown in FIG. 9, the workpiece conveying logistics method includes the following steps.

- S1. Electrical control step: The electrical control module acquires real-time quantity information of the loaded pallets on the first loaded pallet conveying line and the second loaded pallet conveying line, and controls, based on the real-time quantity information, quantities of unloaded pallets conveyed by the unloaded pallet conveying line to each of the first workpiece manufacturing machines and each of the second workpiece manufacturing machines.
- S2. Workpiece receiving step: The workpiece manufacturing machines input unloaded pallets to receiving positions, place manufactured workpieces into the unloaded pallets, and then output the loaded pallets with the workpieces to the first loaded pallet conveying line and the second loaded pallet conveying line, where the first workpiece manufacturing machines and the second workpiece manufacturing machines respectively output the loaded pallets to the first loaded pallet conveying line and the second loaded pallet conveying line.
- S3. Merging step: The merging conveying line receives the loaded pallets from the first loaded pallet conveying line and the second loaded pallet conveying line according to a preset sequence.
- S4. Workpiece retrieval step: The workpiece retrieval station receives the loaded pallets from the merging conveying line, retrieves the workpieces in the loaded pallets, and leaves unloaded pallets at the output end of the workpiece retrieval station, and the workpiece retrieval station conveys the unloaded pallets to the unloaded pallet conveying line.

When the workpiece conveying logistics method is used to manufacture battery cells, the first workpiece manufacturing machine 1 is used to wind type-A bare cells, and the second workpiece manufacturing machine 2 is used to wind type-B bare cells. The unloaded pallet conveying line 5 conveys unloaded pallets 8 to each of the first workpiece manufacturing machines 1 and each of the second workpiece manufacturing machines 2. The unloaded pallets 8 conveyed into the first workpiece manufacturing machine 1 receive type-A bare cells wound by the first workpiece manufacturing machine 1 and are then conveyed to the first loaded pallet conveying line 3. The unloaded pallets 8 conveyed into the second workpiece manufacturing machine 2 receive type-B bare cells wound by the second workpiece manufacturing machine 2 and are then conveyed to the second loaded pallet conveying line 4. The loaded pallets 9 on the first loaded pallet conveying line 3 and the loaded pallets 9 on the second loaded pallet conveying line 4 are conveyed one by one to the merging conveying line 63 according to a preset sequence, so that type-A bare cells and type-B bare cells on the merging conveying line 63 are arranged in the sequence of bare cells within a battery cell. The bare cells arranged in sequence are sequentially retrieved and moved to an integration apparatus for integration. After the bare cells on the merging conveying line 63 are retrieved, unloaded pallets 8 remain, and the unloaded pallets 8 are returned from the merging conveying line 63 to the unloaded pallet conveying line 5. This cycle realizes the conveying of bare cells.

For example, during the conveying process, if the quantities of loaded pallets 9 on the first loaded pallet conveying line 3 and the second loaded pallet conveying line 4 are relatively balanced, the electrical control module controls the unloaded pallet conveying line 5 to convey unloaded pallets 8 to each of the first workpiece manufacturing machines 1 and each of the second workpiece manufacturing machines 2 at a relatively balanced ratio. If one or more of a certain type of workpiece manufacturing machine are in a material-switching standby state, which reduces the output speed of that type of bare cell, it will cause a significant difference in the quantities of loaded pallets 9 on the first loaded pallet conveying line 3 and the second loaded pallet conveying line 4, to be specific, a larger quantity of bare cells on one loaded pallet conveying line and a smaller quantity of bare cells on the other loaded pallet conveying line. At this time, the electrical control module increases the quantity of unloaded pallets 8 allocated to the workpiece manufacturing machines corresponding to the bare cells with a smaller quantity and reduces the quantity of unloaded pallets 8 allocated to the workpiece manufacturing machines corresponding to the bare cells with a larger quantity, so that the bare cells with a smaller quantity are produced at a normal speed, while the bare cells with a larger quantity are produced at a slower speed. Operating in this mode for a certain period can bring the real-time quantities of the two types of bare cells to a basic balance, enabling stable and continuous production of battery cells and thus improving the production efficiency of battery cells.

During the foregoing conveying process, the electrical control module controls the quantity of unloaded pallets 8 conveyed to each workpiece manufacturing machine based on the real-time quantities of two types of bare cells, which affects the output speeds of the two types of bare cells. As a result, the difference in the real-time quantities of the two types of bare cells can be reduced over time, achieving a stable conveying state. This enables stable and continuous production of battery cells and thus improves the production efficiency of battery cells.

In some embodiments of this disclosure, as shown in FIG. 10, the electrical control step includes the following steps.

- S11. Initial allocation step: The electrical control module controls the unloaded pallet conveying line using an initial default mode to convey unloaded pallets without workpieces to each of the workpiece manufacturing machines.
- S12. Real-time quantity information acquisition step: The electrical control module acquires real-time quantity information of the loaded pallets on the first loaded pallet conveying line and the loaded pallets on the second loaded pallet conveying line.
- S13. Unloaded pallet allocation step: The electrical control module controls, based on the real-time quantity information, quantities of unloaded pallets conveyed by the unloaded pallet conveying line to each of the first workpiece manufacturing machines and each of the second workpiece manufacturing machines.

In this manner, the foregoing steps can acquire the range of real-time quantities of the first workpieces and the second workpieces, providing a basis for the electrical control module to control the unloaded pallet conveying line. This enables the unloaded pallet conveying line to allocate appropriate quantities of unloaded pallets to the two types of workpiece manufacturing machines, thereby adjusting the output speeds of the two types of workpiece manufacturing machines. After operating for a certain period, the real-time quantities of the two types of bare cells can reach a basic balance, enabling stable and continuous production of battery cells and thus improving the production efficiency of battery cells.

In some embodiments of this disclosure, the electrical control module has a first control mode, a second control mode, and a third control mode, where the first control mode serves as the initial default mode. As shown in FIG. 11, the unloaded pallet allocation step includes the following steps.

S131. The electrical control module adopts the first control mode under the condition that the real-time quantity of the loaded pallets 9 on the first loaded pallet conveying line 3 and the real-time quantity of the loaded pallets 9 on the second loaded pallet conveying line 4 are respectively within the first set range and the second set range, or respectively less than a lower limit value of the first set range and a lower limit value of the second set range, or respectively greater than an upper limit value of the first set range and an upper limit value of the second set range.

S132. The electrical control module adopts the second control mode under the condition that the real-time quantity of the loaded pallets 9 on the first loaded pallet conveying line 3 is less than a lower limit value of the first set range, and the real-time quantity of the loaded pallets 9 on the second loaded pallet conveying line 4 is greater than an upper limit value of the second set range.

S133. The electrical control module adopts the third control mode under the condition that the real-time quantity of the loaded pallets 9 on the first loaded pallet conveying line 3 is greater than an upper limit value of the first set range, and the real-time quantity of the loaded pallets 9 on the second loaded pallet conveying line 4 is less than a lower limit value of the second set range.

It can be understood that there is no fixed sequence among the three steps S131, S132, and S133, and the execution order of the three steps is selected based on the results obtained in step S12.

The foregoing three control modes switch based on the range of real-time quantity of the loaded pallets 9, enabling the conveying logistics line in an unbalanced state to achieve a stable conveying state within a set time, thereby ensuring stable and continuous production of battery cells and further improving the production efficiency of battery cells.

In some embodiments of this disclosure, in the first control mode, the electrical control module controls the unloaded pallet conveying line 5 to sequentially convey a set quantity of unloaded pallets 8 to workpiece manufacturing machines one by one, starting from a first machine and ending with a last machine; after all the workpiece manufacturing machines have received the set quantity of unloaded pallets 8, the unloaded pallet conveying line cyclically add one unloaded pallet 8 to each of the workpiece manufacturing machines starting from the first machine and ending with the last machine until a quantity of unloaded pallets 8 cached at each workpiece manufacturing machine reaches a maximum allowable cache capacity.

In the second control mode, the electrical control module controls the unloaded pallet conveying line 5 to preferentially input unloaded pallets 8 to the first workpiece manufacturing machines 1 to maintain a quantity of unloaded pallets 8 cached at each of the first workpiece manufacturing machines 1 at a maximum allowable cache capacity, and convey at least a set quantity of unloaded pallets 8 to the second workpiece manufacturing machines 2 and temporarily store these unloaded pallets 8 outside an entrance of the second workpiece manufacturing machines 2.

In the third control mode, the electrical control module controls the unloaded pallet conveying line 5 to preferentially input unloaded pallets 8 to the second workpiece manufacturing machines 2 to maintain a quantity of unloaded pallets 8 cached at each of the second workpiece manufacturing machines 2 at a maximum allowable cache capacity, and convey at least a set quantity of unloaded pallets 8 to the first workpiece manufacturing machines 1 and temporarily store these unloaded pallets 8 outside an entrance of the first workpiece manufacturing machines 1. The set quantity includes 3.

Inputting unloaded pallets 8 to a workpiece manufacturing machine refers to conveying the unloaded pallets 8 into the workpiece manufacturing machine, where the unloaded pallets 8 receive wound bare cells as the workpiece manufacturing machine operates, enabling continuous operation of the workpiece manufacturing machine. Temporarily storing unloaded pallets 8 outside the entrance of a workpiece manufacturing machine refers to conveying the unloaded pallets 8 to the outside of the entrance of the workpiece manufacturing machine without entering the workpiece manufacturing machine. In this case, the workpiece manufacturing machine pauses operation due to the absence of unloaded pallets 8 to receive bare cells, thus reducing the output speed of bare cells for this type of workpiece manufacturing machine. Meanwhile, the other type of workpiece manufacturing machine continues stable operation due to the normal input of unloaded pallets 8, maintaining the output speed of bare cells for that type of workpiece manufacturing machine unchanged. As a result, after operating for a period, the real-time quantities of the two types of bare cells can reach a balance, to be specific, the real-time quantity of the loaded pallets 9 on the first loaded pallet conveying line 3 and the real-time quantity of the loaded pallets 9 on the second loaded pallet conveying line 4 are respectively within the first set range and the second set range.

After the real-time quantities of the two types of bare cells reach a balanced state, the unloaded pallets 8 temporarily stored outside the entrance of the workpiece manufacturing machine are input into the workpiece manufacturing machine, enabling the workpiece manufacturing machine to start operating and produce bare cells at a normal speed. Temporarily storing unloaded pallets 8 outside the entrance of the workpiece manufacturing machine is intended to input these unloaded pallets 8 into the workpiece manufacturing machine promptly after control modes switch, enabling the workpiece manufacturing machine to operate in a timely manner and preventing the output speed of that type of bare cells from being affected due to delayed input of unloaded pallets 8.

The foregoing describes specific operating methods of the three control modes, which can ensure that, within the set operating time of the conveying logistics line, the real-time quantity of the loaded pallets 9 on the first loaded pallet conveying line 3 and the real-time quantity of the loaded pallets 9 on the second loaded pallet conveying line 4 are respectively within the first set range and the second set range.

Temporarily conveying three unloaded pallets 8 to a workpiece manufacturing machine can both meet the short-term demand for unloaded pallets 8 by the workpiece manufacturing machine and leave a sufficient quantity of unloaded pallets 8 for other workpiece manufacturing machines, ensuring adequate circulation of unloaded pallets 8 and thus enabling normal operation of the conveying logistics line.

In some embodiments of this disclosure, the set quantity may be 2, 4, 5, or 6, and of course, may alternatively be other quantities, which are not specifically limited herein.

In some embodiments of this disclosure, the workpieces include bare cells.

The conveying logistics line is applied to a solution for conveying bare cells, realizing the conveying of bare cells and enabling stable and continuous production of battery cells, thereby improving the production efficiency of battery cells.

Below, specific examples of some embodiments of this disclosure are described with reference to the drawings.

As a specific example, the conveying logistics line mainly includes a hardware device and an electrical control. The hardware device includes a winding machine A (first workpiece manufacturing machine 1), a winding machine B (second workpiece manufacturing machine 2), a first loaded pallet A logistics line (first loaded pallet conveying line 3), a loaded pallet B logistics line (second loaded pallet conveying line 4), an unloaded pallet return logistics line (unloaded pallet conveying line 5), a loaded pallet A elevator (first lifting mechanism 61), a second loaded pallet A logistics line (third loaded pallet conveying line 62), a loaded pallet merging logistics line (merging conveying line 63), an unloaded pallet return elevator (second lifting mechanism 64), pallets without bare cells (unloaded pallets 8), a cell retrieval station (workpiece retrieval station 7), pallets with bare cells (loaded pallets 9), and other devices. The electrical control module (electrical control module) includes a complete set of electrical control hardware circuits and a PLC program. The unloaded pallet return logistics line is located at the bottom layer, the loaded pallet B logistics line and the second loaded pallet A logistics line are located at the second layer, and the first loaded pallet A logistics line is located at the third layer.

Unloaded pallets without bare cells are returned by the unloaded pallet return logistics line to the winding machine A and the winding machine B, and are elevated to the first loaded pallet A logistics line and the loaded pallet B logistics line through lifting mechanisms inside the winding machines. Loaded pallets with type-A cells on the first loaded pallet A logistics line are lowered from the third layer to the second loaded pallet A logistics line at the second layer via the loaded pallet A elevator. Loaded pallets with type-B cells are output to the loaded pallet B logistics line at the second layer. The electrical control module controls the sequence of type-A cells and type-B cells entering the loaded pallet merging logistics line, so that type-A cells and type-B cells are arranged in the sequence of bare cells within a battery cell. At a subsequent process station, the cell retrieval station retrieves the cells from the pallets, freeing up unloaded pallets.

The unloaded pallets enter the unloaded pallet return elevator and are returned to the unloaded pallet return logistics line. During the return process, the electrical control module controls, based on the real-time quantities of the two types of bare cells, the quantity of unloaded pallets conveyed to each winding machine A and each winding machine B, which affects the output speeds of the two types of bare cells, so that the difference in the real-time quantities of the two types of bare cells can be reduced, thereby achieving a stable conveying state.

The foregoing embodiments are for description of the technical solutions of this disclosure only rather than for limiting this disclosure. Although this disclosure has been described in detail with reference to the foregoing embodiments, persons of ordinary skill in the art should appreciate that they can still make modifications to the technical solutions described in the embodiments or make equivalent replacements to some or all technical features thereof. However, these modifications or replacements do not make the essence of the corresponding technical solutions deviate from the scope of the technical solutions of the embodiments of this disclosure, and they should all be included in the scope of the claims and description of this disclosure. In particular, as long as there is no structural conflict, the various technical features mentioned in the embodiments can be combined in any manner.

INDUSTRIAL APPLICABILITY

This disclosure discloses a conveying logistics line and method and a pallet logistics control method. The conveying logistics line includes an unloaded pallet conveying line, a first loaded pallet conveying line, a second loaded pallet conveying line, a merging conveying line, a workpiece retrieval station, and an electrical control module. The electrical control module is communicatively connected to the unloaded pallet conveying line, and configured to control quantities of unloaded pallets conveyed by the unloaded pallet conveying line to each of the first workpiece manufacturing machines and each of the second workpiece manufacturing machines, based on real-time quantity information of the loaded pallets on the first loaded pallet conveying line and the second loaded pallet conveying line, so as to achieve a stable conveying state within a set operating time of the conveying logistics line, where the stable conveying state includes a real-time quantity of the loaded pallets on the first loaded pallet conveying line and a real-time quantity of the loaded pallets on the second loaded pallet conveying line being within a first set range and a second set range, respectively. The conveying logistics line and method and the pallet logistics control method provided in this disclosure simplify the structure and improve conveying efficiency.

The invention claimed is:
1. A conveying logistics line, comprising:
an unloaded pallet conveying line, wherein along an extension direction of the unloaded pallet conveying line, a plurality of workpiece manufacturing machines are sequentially distributed, the plurality of workpiece manufacturing machines comprise at least one first workpiece manufacturing machine and at least one second workpiece manufacturing machine that are alternately distributed, the unloaded pallet conveying line is connected to an input end of each of the workpiece manufacturing machines, and the unloaded pallet conveying line is configured to be capable of conveying unloaded pallets without workpieces to each of the workpiece manufacturing machines;
a first loaded pallet conveying line connected to an output end of each of the first workpiece manufacturing machines, wherein the first loaded pallet conveying line is configured to be capable of receiving and conveying loaded pallets with first workpieces from each of the first workpiece manufacturing machines;
a second loaded pallet conveying line connected to an output end of each of the second workpiece manufacturing machines, wherein the second loaded pallet conveying line is configured to be capable of receiving and conveying loaded pallets with second workpieces from each of the second workpiece manufacturing machines;
a merging conveying line connected to the first loaded pallet conveying line and the second loaded pallet conveying line, wherein the merging conveying line is configured to receive the loaded pallets from the first loaded pallet conveying line and the loaded pallets from the second loaded pallet conveying line according to a preset sequence;

a workpiece retrieval station, wherein an input end and output end of the workpiece retrieval station are respectively connected to an output end of the merging conveying line and an input end of the unloaded pallet conveying line; and an electrical control module communicatively connected to the unloaded pallet conveying line and configured to control quantities of unloaded pallets conveyed by the unloaded pallet conveying line to each of the first workpiece manufacturing machines and each of the second workpiece manufacturing machines, based on real-time quantity information of the loaded pallets on the first loaded pallet conveying line and the second loaded pallet conveying line, so as to achieve a stable conveying state within a set operating time of the conveying logistics line, wherein the stable conveying state comprises the real-time quantity of loaded pallets on the first loaded pallet conveying line and the real-time quantity of loaded pallets on the second loaded pallet conveying line being within a first set range and a second set range respectively.

2. The conveying logistics line according to claim 1, wherein the first loaded pallet conveying line is provided with a first pallet quantity detection assembly, wherein the first pallet quantity detection assembly is configured to detect a relationship between the real-time quantity of the loaded pallets on the first loaded pallet conveying line and an upper limit value and lower limit value of the first set range;

the second loaded pallet conveying line is provided with a second pallet quantity detection assembly, wherein the second pallet quantity detection assembly is configured to detect a relationship between the real-time quantity of the loaded pallets on the second loaded pallet conveying line and an upper limit value and lower limit value of the second set range; and the electrical control module is communicatively connected to the first pallet quantity detection assembly and the second pallet quantity detection assembly, and capable of controlling, based on data information detected by the first pallet quantity detection assembly and the second pallet quantity detection assembly, quantities of unloaded pallets conveyed by the unloaded pallet conveying line to each of the first workpiece manufacturing machines and each of the second workpiece manufacturing machines.

3. The conveying logistics line according to claim 2, wherein the first pallet quantity detection assembly comprises a first underload detection sensor and a first full-load detection sensor, wherein the first underload detection sensor and the first full-load detection sensor are sequentially arranged along a conveying path of the first loaded pallet conveying line; and the first underload detection sensor is triggered under the condition that the real-time quantity of the loaded pallets on the first loaded pallet conveying line is less than the lower limit value of the first set range, and the first full-load detection sensor is triggered under the condition that the real-time quantity of the loaded pallets on the first loaded pallet conveying line is greater than the upper limit value of the first set range; and the second pallet quantity detection assembly comprises a second underload detection sensor and a second full-load detection sensor, wherein the second underload detection sensor and the second full-load detection sensor are sequentially arranged along a conveying path of the second loaded pallet conveying line; and the second underload detection sensor is triggered under the condition that the real-time quantity of the loaded pallets on the second loaded pallet conveying line is less than the lower limit value of the second set range, and the second full-load detection sensor is triggered under the condition that the real-time quantity of the loaded pallets on the second loaded pallet conveying line is greater than the upper limit value of the second set range.

4. The conveying logistics line according to claim 1, wherein the electrical control module has a first control mode, a second control mode, and a third control mode; wherein the electrical control module adopts the first control mode under the condition that the real-time quantity of the loaded pallets on the first loaded pallet conveying line and the real-time quantity of the loaded pallets on the second loaded pallet conveying line are respectively within the first set range and the second set range, or respectively less than the lower limit value of the first set range and the lower limit value of the second set range, or respectively greater than the upper limit value of the first set range and the upper limit value of the second set range, wherein the first control mode also serves as an initial default mode;

the electrical control module adopts the second control mode under the condition that the real-time quantity of the loaded pallets on the first loaded pallet conveying line is less than the lower limit value of the first set range and the real-time quantity of the loaded pallets on the second loaded pallet conveying line is greater than the upper limit value of the second set range; and the electrical control module adopts the third control mode under the condition that the real-time quantity of the loaded pallets on the first loaded pallet conveying line is greater than the upper limit value of the first set range and the real-time quantity of the loaded pallets on the second loaded pallet conveying line is less than the lower limit value of the second set range.

5. The conveying logistics line according to claim 4, wherein in the first control mode, the electrical control module controls the unloaded pallet conveying line to sequentially convey a set quantity of unloaded pallets to workpiece manufacturing machines one by one, starting from a first machine and ending with a last machine, and after all the workpiece manufacturing machines have received the set quantity of unloaded pallets, cyclically add one unloaded pallet to each of the workpiece manufacturing machines starting from the first machine and ending with the last machine until a quantity of unloaded pallets cached at each workpiece manufacturing machine reaches a maximum allowable cache capacity;

in the second control mode, the electrical control module controls the unloaded pallet conveying line to preferentially input unloaded pallets to the first workpiece manufacturing machines to maintain a quantity of unloaded pallets cached at each of the first workpiece manufacturing machines at a maximum allowable cache capacity, and convey at least a set quantity of unloaded pallets to the second workpiece manufacturing machines and temporarily store these unloaded pallets outside an entrance of the second workpiece manufacturing machines; wherein the unloaded pallets temporarily stored outside the entrance of the second workpiece manufacturing machines are used to be input into the second workpiece manufacturing machines when the conveying logistics line switches from the second control mode to the first control mode; and in the third control mode, the electrical control module controls the unloaded pallet conveying line to preferentially input unloaded pallets to the second workpiece manufacturing machines to maintain a quantity of unloaded pallets cached at each of the second workpiece manufacturing machines at a maximum allowable cache capacity, and convey at least a set quantity of unloaded pallets to the first workpiece manufacturing machines and temporarily store these unloaded pallets outside an entrance of the first workpiece manufacturing machines; wherein the unloaded pallets temporarily stored outside the entrance of the first workpiece manufacturing machines are used to be input into the first workpiece manufacturing machines when the conveying logistics line switches from the third control mode to the first control mode.

6. The conveying logistics line according to claim 5, wherein the set quantity comprises 3.

7. The conveying logistics line according to claim 1, wherein a conveying path of the first loaded pallet conveying line, a conveying path of the second loaded pallet conveying line, and a conveying path of the unloaded pallet conveying line are sequentially distributed from top to bottom, and the workpiece manufacturing machines are all correspondingly arranged on the same side of the first loaded pallet conveying line, the second loaded pallet conveying line, and the unloaded pallet conveying line.

8. The conveying logistics line according to claim 7, wherein the conveying path of the second loaded pallet conveying line, a conveying path of the merging conveying line, and a conveying path of the workpiece retrieval station are at the same height;

the conveying logistics line further comprises a first lifting mechanism, a third loaded pallet conveying line, and a second lifting mechanism, wherein a conveying path of the third loaded pallet conveying line and the conveying path of the second loaded pallet conveying line are at the same height, a top input end and a bottom output end of the first lifting mechanism are respectively connected to an output end of the first loaded pallet conveying line and an input end of the third loaded pallet conveying line, and an output end of the third loaded pallet conveying line is connected to an input end of the merging conveying line; and a top input end and a bottom output end of the second lifting mechanism are respectively connected to an output end of the workpiece retrieval station and an input end of the unloaded pallet conveying line.

9. The conveying logistics line according to claim 1, wherein the workpieces comprise bare cells.

10. A pallet logistics control method applied to a conveying logistics line, wherein the conveying logistics line comprises:

an unloaded pallet conveying line, wherein along an extension direction of the unloaded pallet conveying line, a plurality of workpiece manufacturing machines are sequentially distributed, the plurality of workpiece manufacturing machines comprise at least one first workpiece manufacturing machine and at least one second workpiece manufacturing machine that are alternately distributed, the unloaded pallet conveying line is connected to an input end of each of the workpiece manufacturing machines, and the unloaded pallet conveying line is configured to be capable of conveying unloaded pallets without workpieces to each of the workpiece manufacturing machines;

a first loaded pallet conveying line connected to an output end of each of the first workpiece manufacturing machines, wherein the first loaded pallet conveying line is configured to be capable of receiving and conveying loaded pallets with first workpieces from each of the first workpiece manufacturing machines;

a second loaded pallet conveying line connected to an output end of each of the second workpiece manufacturing machines, wherein the second loaded pallet conveying line is configured to be capable of receiving and conveying loaded pallets with second workpieces from each of the second workpiece manufacturing machines;

a merging conveying line connected to the first loaded pallet conveying line and the second loaded pallet conveying line, wherein the merging conveying line receives the loaded pallets from the first loaded pallet conveying line and the loaded pallets from the second loaded pallet conveying line according to a preset sequence;

a workpiece retrieval station, wherein an input end and output end of the workpiece retrieval station are respectively connected to an output end of the merging conveying line and an input end of the unloaded pallet conveying line; and an electrical control module communicatively connected to the unloaded pallet conveying line, wherein the electrical control module controls the unloaded pallet conveying line using the control method so that the conveying logistics line achieves a stable conveying state within a set operating time, the stable conveying state comprising a real-time quantity of the loaded pallets on the first loaded pallet conveying line and a real-time quantity of the loaded pallets on the second loaded pallet conveying line being within a first set range and a second set range, respectively; and the control method comprises:

a real-time quantity information acquisition step: acquiring, by the electrical control module, real-time quantity information of the loaded pallets on the first loaded pallet conveying line and the loaded pallets on the second loaded pallet conveying line;

an unloaded pallet allocation step: controlling, by the electrical control module based on the real-time quantity information, quantities of unloaded pallets conveyed by the unloaded pallet conveying line to each of the first workpiece manufacturing machines and each of the second workpiece manufacturing machines.

11. The pallet logistics control method according to claim 10, wherein the electrical control module has a first control mode, a second control mode, and a third control mode, wherein the first control mode serves as an initial default mode; and the unloaded pallet allocation step comprises:

adopting, by the electrical control module, the first control mode under the condition that the real-time quantity of the loaded pallets on the first loaded pallet conveying line and the real-time quantity of the loaded pallets on the second loaded pallet conveying line are respectively within the first set range and the second set range, or respectively less than a lower limit value of the first set range and a lower limit value of the second set range, or respectively greater than an upper limit value of the first set range and an upper limit value of the second set range;

adopting, by the electrical control module, the second control mode under the condition that the real-time quantity of the loaded pallets on the first loaded pallet conveying line is less than a lower limit value of the first set range and the real-time quantity of the loaded pallets on the second loaded pallet conveying line is greater than an upper limit value of the second set range;

adopting, by the electrical control module, the third control mode under the condition that the real-time quantity of the loaded pallets on the first loaded pallet conveying line is greater than an upper limit value of the first set range and the real-time quantity of the loaded pallets on the second loaded pallet conveying line is less than a lower limit value of the second set range.

12. The pallet logistics control method according to claim 11, wherein
in the first control mode, the electrical control module controls the unloaded pallet conveying line to sequentially convey a set quantity of unloaded pallets to workpiece manufacturing machines one by one, starting from a first machine and ending with a last machine, and after all the workpiece manufacturing machines have received the set quantity of unloaded pallets, cyclically add one unloaded pallet to each of the workpiece manufacturing machines starting from the first machine and ending with the last machine until a quantity of unloaded pallets cached at each workpiece manufacturing machine reaches a maximum allowable cache capacity;

in the second control mode, the electrical control module controls the unloaded pallet conveying line to preferentially input unloaded pallets to the first workpiece manufacturing machines to maintain a quantity of unloaded pallets cached at each of the first workpiece manufacturing machines at a maximum allowable cache capacity, and convey at least a set quantity of unloaded pallets to the second workpiece manufacturing machines and temporarily store these unloaded pallets outside an entrance of the second workpiece manufacturing machines; and in the third control mode, the electrical control module controls the unloaded pallet conveying line to preferentially input unloaded pallets to the second workpiece manufacturing machines to maintain a quantity of unloaded pallets cached at each of the second workpiece manufacturing machines at a maximum allowable cache capacity, and convey at least a set quantity of unloaded pallets to the first workpiece manufacturing machines and temporarily store these unloaded pallets outside an entrance of the first workpiece manufacturing machines; wherein
the set quantity comprises 3.

13. A conveying logistics method applied to a conveying logistics line, wherein
the conveying logistics line comprises:
an unloaded pallet conveying line, wherein along an extension direction of the unloaded pallet conveying line, a plurality of workpiece manufacturing machines are sequentially distributed, the plurality of workpiece manufacturing machines comprise at least one first workpiece manufacturing machine and at least one second workpiece manufacturing machine that are alternately distributed;

a first loaded pallet conveying line connected to an output end of each of the first workpiece manufacturing machines, wherein the first loaded pallet conveying line is configured to be capable of receiving and conveying loaded pallets with first workpieces from each of the first workpiece manufacturing machines;

a second loaded pallet conveying line connected to an output end of each of the second workpiece manufacturing machines, wherein the second loaded pallet conveying line is configured to be capable of receiving and conveying loaded pallets with second workpieces from each of the second workpiece manufacturing machines;

a merging conveying line connected to the first loaded pallet conveying line and the second loaded pallet conveying line;

a workpiece retrieval station, wherein an input end and output end of the workpiece retrieval station are respectively connected to an output end of the merging conveying line and an input end of the unloaded pallet conveying line; and an electrical control module communicatively connected to the unloaded pallet conveying line; and the conveying logistics method comprises:
an electrical control step: acquiring, by the electrical control module, real-time quantity information of the loaded pallets on the first loaded pallet conveying line and the second loaded pallet conveying line, and controlling, based on the real-time quantity information, quantities of unloaded pallets conveyed by the unloaded pallet conveying line to each of the first workpiece manufacturing machines and each of the second workpiece manufacturing machines;

a workpiece receiving step: inputting, by the workpiece manufacturing machines, unloaded pallets to receiving positions, placing manufactured workpieces into the unloaded pallets, and outputting the loaded pallets with the workpieces to the first loaded pallet conveying line and the second loaded pallet conveying line, wherein the first workpiece manufacturing machines and the second workpiece manufacturing machines respectively output the loaded pallets to the first loaded pallet conveying line and the second loaded pallet conveying line;

a merging step: receiving, by the merging conveying line, the loaded pallets from the first loaded pallet conveying line and the second loaded pallet conveying line according to a preset sequence;

a workpiece retrieval step: receiving, by the workpiece retrieval station, the loaded pallets from the merging conveying line, retrieving the workpieces in the loaded pallets, and leaving unloaded pallets at the output end of the workpiece retrieval station, and conveying, by the workpiece retrieval station, the unloaded pallets to the unloaded pallet conveying line; wherein
the conveying logistics line is capable of achieving a stable conveying state within a set operating time using the conveying logistics method, wherein the stable conveying state comprises a real-time quantity of the loaded pallets on the first loaded pallet conveying line and a real-time quantity of the loaded pallets on the second loaded pallet conveying line being within a first set range and a second set range, respectively.

14. The conveying logistics method according to claim 13, wherein the electrical control step comprises:
- an initial allocation step: controlling, by the electrical control module using an initial default mode, the unloaded pallet conveying line to convey unloaded pallets without workpieces to each of the workpiece manufacturing machines;
- a real-time quantity information acquisition step: acquiring, by the electrical control module, the real-time quantity information of the loaded pallets on the first loaded pallet conveying line and the loaded pallets on the second loaded pallet conveying line; and
- an unloaded pallet allocation step: controlling, by the electrical control module based on the real-time quantity information, quantities of unloaded pallets conveyed by the unloaded pallet conveying line to each of the first workpiece manufacturing machines and each of the second workpiece manufacturing machines.

15. The conveying logistics method according to claim 14, wherein the electrical control module has a first control mode, a second control mode, and a third control mode, wherein the first control mode serves as the initial default mode; and the unloaded pallet allocation step comprises:
- adopting, by the electrical control module, the first control mode under the condition that the real-time quantity of the loaded pallets on the first loaded pallet conveying line and the real-time quantity of the loaded pallets on the second loaded pallet conveying line are respectively within the first set range and the second set range, or respectively less than a lower limit value of the first set range and a lower limit value of the second set range, or respectively greater than an upper limit value of the first set range and an upper limit value of the second set range;
- adopting, by the electrical control module, the second control mode under the condition that the real-time quantity of the loaded pallets on the first loaded pallet conveying line is less than a lower limit value of the first set range and the real-time quantity of the loaded pallets on the second loaded pallet conveying line is greater than an upper limit value of the second set range; and
- adopting, by the electrical control module, the third control mode under the condition that the real-time quantity of the loaded pallets on the first loaded pallet conveying line is greater than an upper limit value of the first set range and the real-time quantity of the loaded pallets on the second loaded pallet conveying line is less than a lower limit value of the second set range.

16. The conveying logistics method according to claim 15, wherein:
- in the first control mode, the electrical control module controls the unloaded pallet conveying line to sequentially convey a set quantity of unloaded pallets to workpiece manufacturing machines one by one, starting from a first machine and ending with a last machine, and after all the workpiece manufacturing machines have received the set quantity of unloaded pallets, cyclically add one unloaded pallet to each of the workpiece manufacturing machines starting from the first machine and ending with the last machine until a quantity of unloaded pallets cached at each workpiece manufacturing machine reaches a maximum allowable cache capacity;
- in the second control mode, the electrical control module controls the unloaded pallet conveying line to preferentially input unloaded pallets to the first workpiece manufacturing machines to maintain a quantity of unloaded pallets cached at each of the first workpiece manufacturing machines at a maximum allowable cache capacity, and convey at least a set quantity of unloaded pallets to the second workpiece manufacturing machines and temporarily store these unloaded pallets outside an entrance of the second workpiece manufacturing machines; and
- in the third control mode, the electrical control module controls the unloaded pallet conveying line to preferentially input unloaded pallets to the second workpiece manufacturing machines to maintain a quantity of unloaded pallets cached at each of the second workpiece manufacturing machines at a maximum allowable cache capacity, and convey at least a set quantity of unloaded pallets to the first workpiece manufacturing machines and temporarily store these unloaded pallets outside an entrance of the first workpiece manufacturing machines; wherein the set quantity comprises 3.

* * * * *